(12) United States Patent
Tanaka et al.

(10) Patent No.: US 6,674,021 B2
(45) Date of Patent: Jan. 6, 2004

(54) COMBINATION WEIGHING EQUIPMENT WITH SEALED HAPPER DOOR DRIVING MECHANISMS TO FACILITATE CLEANING

(75) Inventors: Osamu Tanaka, Atsugi (JP); Nobuyuki Wakabayashi, Atsugi (JP)

(73) Assignee: Anritsu Corporation, Tokyo (JP)

( * ) Notice: Subject to any disclaimer, the term of this patent is extended or adjusted under 35 U.S.C. 154(b) by 233 days.

(21) Appl. No.: 09/959,182
(22) PCT Filed: Mar. 15, 2001
(86) PCT No.: PCT/JP01/02066
§ 371 (c)(1), (2), (4) Date: Oct. 18, 2001
(87) PCT Pub. No.: WO01/68493
PCT Pub. Date: Sep. 20, 2001

(65) Prior Publication Data
US 2002/0157875 A1 Oct. 31, 2002

(30) Foreign Application Priority Data
Mar. 17, 2000 (JP) .......................... 2000-076552
Jun. 13, 2000 (JP) .......................... 2000-177281

(51) Int. Cl.[7] .................. G01G 19/387; G01G 21/28
(52) U.S. Cl. ................................ 177/25.18; 177/238
(58) Field of Search .................. 177/25.18, 238, 177/243

(56) References Cited

U.S. PATENT DOCUMENTS 6,188,029 B1 * 2/2001 Miyamoto et al. ....... 177/25.18

FOREIGN PATENT DOCUMENTS

| JP | 7-49262 A | 2/1995 |
| JP | 9-280931 A | 10/1997 |
| JP | 9-280934 A | 10/1997 |

* cited by examiner

*Primary Examiner*—Randy Gibson
(74) *Attorney, Agent, or Firm*—Frishauf, Holtz, Goodman & Chick, P.C.

(57) ABSTRACT

A combination weighing apparatus is constituted by a plurality of hopper supporting arms (100) protruding to an external portion from a casing having a plurality of drive sources (63) in an inner portion thereof and sealing opening and closing operation driving mechanisms (116) for transmitting a drive force from the drive sources (63) in inner portions thereof, a plurality of hoppers (130) attached to front ends of a plurality of hopper supporting arms (100), having receiving ports for subjects to be weighed at upper ends and having discharge ports with rotatable opening and closing lids (147) at lower ends, couplings respectively mounted to the opening and closing lids (147), and opening and closing operation driving bodies exposing to outer surfaces of the hopper attaching portions at the front ends of the hopper supporting arms (100), driven by the opening and closing operation driving mechanisms (116), and opening and closing the opening and closing lids (147) engaged with the couplings due to the attachment of the hoppers (130), whereby a cleaning can be easily performed as a whole.

19 Claims, 21 Drawing Sheets

COMBINATION WEIGHING EQUIPMENT WITH SEALED HAPPER DOOR DRIVING MECHANISMS TO FACILITATE CLEANING

This application is a U.S. National Phase Application under 35 Usc 371 of InternatiOnal Application PCT/JP01/02066 (not published in English) filed Mar. 15, 2001.

TECHNICAL FIELD

The present invention relates to a combination weighing apparatus, and more particularly to a combination weighing apparatus structured such that the whole apparatus can be easily cleaned at a time of treating foods or the like as a subject to be weighed.

BACKGROUND ART

As is well known, conventionally, a combination weighing apparatus is employed for bagging foods, that is, goods individually having uneven mass, for example, potato chips, peanuts, fruits, sausages and the like at a predetermined mass or a substantially predetermined mass in a lump.

In this kind of combination weighing apparatus, for example, a plurality of radial feeders are radially provided around a center dispersing table, a plurality of stock hoppers, a plurality of weighing hoppers and the like are vertically arranged respectively below a front end of each of. the radial feeders, and a collecting chute is provided below each of the stock hoppers, each of the weighing hoppers and the like.

Further, in the combination weighing apparatus mentioned above, for example, the subjects to be weighed such as the foods or the like as mentioned above are supplied to the dispersing table by a conveyor or the like, the subjects to be weighed supplied to the dispersing table are downward moved so as to be dropped down to each of the stock hoppers by a plurality of radial feeders, and the subjects to be weighed moved to each of the stock hoppers are moved downward so as to be dropped down to each of the weighing hoppers.

Further, the mass of the subjects to be weighed moved to each of the weighing hoppers is weighed at each of the weighing hoppers.

In this case, the mass of the subjects to be weighed within a plurality of weighing hoppers is combined and added by a calculating portion (not shown), whereby a predetermined mass or a combination close thereto is selected, and thereafter, the subjects to be weighed in correspondence to the selected combination are dropped down and discharged to a collecting chute from each of the weighing hoppers so as to be gathered together.

Then, the subjects to be weighed dropped down to the collecting chute so as to be gathered together are conveyed out to the next step such as a packaging machine or the like.

Accordingly, in the conventional combination weighing apparatus having the structure mentioned above, for example, as shown in FIG. 39, a plurality of stock hoppers 1, a plurality of weighing hoppers 2 and the like arranged in a circumferential direction are detachably supported to brackets 4 and 5 protruded from an outer periphery of a center casing 3 respectively by engaging members 17a, 17b, 18a and 18b provided in back surface portions of each of the hoppers 1 and 2.

That is, the respective hoppers 1 and 2 are frequently engaged with or disengaged from the brackets 4 and 5 for the purpose of cleaning and maintaining and inspecting the combination weighing apparatus, as mentioned below.

Further, opening and closing lids 6 and 7 are provided in bottom portions of the respective hoppers 1 and 2.

Complex opening and closing link mechanisms 8 and 9 for opening and closing the opening and closing lids 6 and 7, and restoration springs 10 and 11 are provided on outer surfaces of side wall portions in the respective hoppers 1 and 2.

Further, movable bodies 12 and 13 driven by a drive source arranged within the casing 3 are provided so as to protrude outward from holes (not shown) in the casing 3.

The structure is made such that the movable bodies 12 and 13 drive the opening and closing link mechanisms 8 and 9 of the respective hoppers 1 and 2, whereby the opening and closing lids 6 and 7 in the respective hoppers 1 and 2 are opened, and the opened opening and closing lids 6 and 7 in the respective hoppers 1 and 2 are closed by the restoration springs 10 and 11.

Further, the structure is made such that the bracket 5 supporting each of the weighing hoppers 2 protrudes outward from a hole (not shown) in the casing 3 and can be moved by the mass of the subjects to be weighed within the weighing hopper 2.

The bracket 5 is supported to a weighing device (not shown) within the casing 3.

In this case, in FIG. 39, reference numeral 14 denotes a center dispersing table and reference numeral 15 denotes a radial feeder.

In the combination weighing apparatus having the structure mentioned above, in the case that the subjects to be weighed are particularly foods, the subjects to be weighed are violently supplied, dropped down and discharged between the respective hoppers and the collecting chute due to a significantly high speed drive.

Accordingly, in the combination weighing apparatus mentioned above, the subjects to be weighed supplied and dropped down or fine powder mists thereof are gradually attached and accumulated around the whole from the respective portions of the combination weighing apparatus such as the respective hoppers 1 and 2, the casing 3 and the like during continued use.

If the attachment and accumulation of the subjects to be weighed and the fine powder mists are left, there is a risk that an operation of the combination weighing apparatus is an obstacle or bacteria breed in the subjects to be weighed or the fine power mists attached and accumulated in the respective portions or these materials are spoilt.

That is, as mentioned above, in the conventional combination weighing apparatus the significantly complex opening and closing link mechanisms 8 and 9 and the restoration springs 10 and 11 are provided in the respective hoppers 1 and 2, and the complex brackets 4 and 5 and the movable bodies 12 and 13 are provided in the respective hoppers 1 and 2 so as to protrude outward from the casing 3.

Further, a lot of holes are provided in a complex manner in the casing so that the movable bodies and the brackets can move.

Accordingly, since the structures of the opening and closing link mechanism 8 and 9, the restoration springs 10 and 11, the brackets, the movable bodies 12 and 13, the holes in the casing 3 and the like are significantly complex, the subjects to be weighed and the fine powder mists thereof are easily attached and accumulated in the complex structure portions and the bonding portions, and the attached and accumulated subjects to be weighed and the fine powder mists easily encourage bacteria to breed, etc.

Accordingly, it is necessary to frequently clean the whole weighing apparatus.

Accordingly, as mentioned above, in the conventional combination weighing apparatus, the structures of the opening and closing link mechanisms 8 and 9, the restoration springs 10 and 11, the brackets, the movable bodies 12 and 13, the holes in the casing 3 and the like which are provided in the respective hoppers 1 and 2 are significantly complex, there is a problem that it is hard to clean and it is significantly inconvenient in view of a food hygiene.

Further, as mentioned above, in the conventional combination weighing apparatus, since the mechanism for engaging and disengaging the respective hoppers 1 and 2 with and from the casing 3 are disposed on the back surfaces of the respective hoppers 1 and 2, it is necessary for a worker to frequently engage and disengage a lot of hoppers 1 and 2 on a high table with an invisible state, so that there is a problem that it is very hard to execute the engaging and disengaging operation.

Further, as mentioned above, in the conventional combination weighing apparatus, since the mounting structure of the respective hoppers 1 and 2 is separated from the opening and closing operation driving structure of the opening and closing lids 6 and 7, there is a problem that the whole structure is too complex.

DISCLOSURE OF INVENTION

An object of the present invention is to provide a combination weighing apparatus which solves the problems and the disadvantages in the conventional combination weighing apparatus as mentioned above and can be easily cleaned.

(1) In accordance with a first aspect of the present invention, in order to achieve the object mentioned above, there is provided a combination weighing apparatus comprising:

a casing;

a plurality of drive sources provided in an inner portion of the casing;

a plurality of hollow hopper supporting arms provided so as to protrude to an external portion from the casing;

a plurality of opening and closing operation driving mechanisms sealed in respective inner portions of the plurality of hopper supporting arms and transmitting drive forces respectively applied from the plurality of drive sources;

a plurality of hoppers attached to hopper attaching portions at respective front ends of the plurality of hopper supporting arms, respectively having receiving ports for subjects to be weighed at respective upper ends and having discharge ports for the subjects to be weighed at respective lower ends;

a plurality of opening and closing lids respectively provided in the plurality of hoppers in a freely rotatable manner, and respectively opening and closing the discharge ports of the plurality of hoppers;

a plurality of cup rings respectively mounted to the plurality of opening and closing lids; and a plurality of opening and closing operation driving bodies provided on outer surfaces of the hopper attaching portions at the respective front ends of the plurality of hopper supporting arms in an exposed state, respectively driven by the plurality of opening and closing operation driving mechanisms, and respectively engaged with the plurality of couplings due to the respective attachment of the plurality of hoppers so as to respectively open and close the plurality of opening and closing lids.

In the combination weighing apparatus in accordance with the first aspect structured in the manner mentioned above, when attaching the respective hoppers to the hopper attaching portions at the front ends of the respective hopper supporting arms, the respective opening and closing operation driving bodies exposed to the outer surfaces of the hopper attaching portions are engaged with the respective couplings provided in the respective opening and closing lids in the respective hoppers, the respective opening and closing operation driving bodies are driven by the respective opening and closing operation driving mechanisms sealed within the respective hopper supporting arms due to the driving force from the respective drive sources within the casing, and the respective opening and closing lids in the respective hoppers are opened and closed, so that it is unnecessary for the complex opening and closing link For mechanisms, the restoration springs and the like to be exposed outside the apparatus. Accordingly, the subjects to be weighed, the fine powder mists and the like are less attached and accumulated, and a cleaning performance is significantly improved, whereby in the case that the subjects to be weighed are foods, it is hard for unhygienic conditions to be generated, and it is easy to clean the whole weighing apparatus.

Further, in the combination weighing apparatus in accordance with the first aspect, since two objects comprising the support of the respective hoppers and the drive of the respective opening and closing lids in the respective hoppers can be achieved only by the respective hopper supporting arms, it is not necessary that the hopper supporting mechanisms and the opening and closing operation driving mechanisms are provided so as to independently protrude from the casing, and the structure is made simple, so that the disadvantages in the subjects to be weighed, the attachment and accumulation and the like are reduced.

(2) In accordance with a second aspect of the present invention, in order to achieve the object mentioned above, there is provided a combination weighing apparatus as recited in the first aspect, wherein respective rotary shafts of the plurality of couplings and respective rotary shafts of the plurality of opening and closing operation driving bodies are arranged on the same axis.

In the combination weighing apparatus in accordance with the second aspect structured in the manner mentioned above, since the respective rotary shafts of the respective couplings mounted to the respective opening and closing lids in the respective hoppers and the respective rotary shafts of the respective opening and closing operation driving bodies are arranged on the same axis, the respective opening and closing lids in the respective hoppers can be further smoothly opened and closed.

(3) Further, in accordance with a third aspect of the present invention, in order to achieve the object mentioned above, there is provided a combination weighing apparatus as recited in the first aspect, wherein the plurality of drive sources are respectively constituted by motors, and the plurality of opening and closing operation driving mechanisms are respectively constituted by link mechanisms connected to the respective motors.

In the combination weighing apparatus in accordance with the third aspect structured in the manner mentioned above, since the plurality of drive sources are respectively constituted by the motors, and the plurality of opening and closing operation driving mechanisms are respectively constituted by the link mechanisms connected to the respective motors, the respective opening and closing lids in the respective hoppers can be further smoothly opened and closed.

(4) Further, in accordance with a fourth aspect of the present invention, in order to achieve the object mentioned above, there is provided a combination weighing apparatus as recited in the first aspect, wherein in the case that the plurality of hoppers are weighing hoppers for weighing the subjects to be weighed, the plurality of hoppers are further provided with a plurality of weighing devices respectively measuring the respective masses of the subjects to be weighed received in the respective weighing hoppers, and the plurality of weighing devices are respectively structured such that respective fixed ends of the plurality of weighing devices are fixed to an inner side of the casing, and respective free ends of the plurality of weighing devices fix the plurality of drive sources to the plurality of hopper supporting arms provided so as to protrude outward from insertion holes provided in the casing.

In the combination weighing apparatus in accordance with the fourth aspect structured in the manner mentioned above, since in the case that the respective hoppers are the weighing hoppers for weighing the subjects to be weighed, the respective weighing devices respectively measuring the masses of the respective subjects to be weighed received in the respective weighing hoppers are respectively structured such that the fixed ends of the respective weighing devices are fixed to the inner side of the casing, and the free ends of the respective weighing devices fix the respective drive sources to the respective hopper supporting arms provided so as to protrude outward from the insertion holes provided in the casing, the subjects to be weighed and the fine powder mists thereof are less attached and accumulated in the respective weighing devices and the like, and a cleaning performance is significantly improved. In the case that the subjects to be weighed are the foods, it is hard that a disadvantage on a food sanitation is generated and it is easy to clean a whole weighing apparatus.

(5) Further, in accordance with a fifth aspect of the present invention, in order to achieve the object mentioned above, there is provided a combination weighing apparatus as recited in the first aspect, wherein the plurality of hoppers are respectively supported to a plurality of supporting arms provided so as to protrude outward from the casing, in such a manner as to be freely attached and detached in respective side portions of the plurality of hoppers.

In the combination weighing apparatus in accordance with the fifth aspect structured in the manner mentioned above, since the respective hoppers are detachably supported to the respective supporting arms provided outward from the casing in the side portions of the respective hoppers, the worker can attach and detach while viewing the side portions of the respective hoppers, so that it is significantly easy and secure to engage and disengage the respective hoppers.

(6) Further, in accordance with a sixth aspect of the present invention, in order to achieve the object mentioned above, there is provided a combination weighing apparatus as recited in the first aspect, further comprising a plurality of hooks fixed to the respective side walls of the plurality of hoppers, wherein the plurality of hooks are respectively engaged in correspondence to the plurality of supporting arms, whereby the plurality of hoppers are respectively supported in correspondence to the plurality of supporting arms.

In the combination weighing apparatus in accordance with the sixth aspect structured in the manner mentioned above, since the respective hooks are fixed to the side walls of the respective hoppers and the respective hoppers are supported to the respective supporting arms by engaging the respective hooks with the respective supporting arms, it is possible to easily engage and disengage the respective hoppers by the respective hooks.

(7) Further, in accordance with a seventh aspect of the present invention, in order to achieve the object mentioned above, there is provided a combination weighing apparatus as recited in the sixth aspect, wherein the plurality of hooks are respectively provided with leg portions respectively supported by the plurality of supporting arms from lower sides thereof, and rotation restricting means for restricting the rotation of the plurality of hoppers due to gravitation with respect to the plurality of supporting arms.

In the combination weighing apparatus in accordance with the seventh aspect structured in the manner mentioned above, since the respective hooks are provided with the leg portions supported by the respective supporting arms from the lower sides thereof, and the rotation restricting means for restricting the rotation of the hoppers due to the gravitation with respect to the respective supporting arms, it is possible to securely support in a state that the rotation of the respective hoppers due to the gravity around the lower end portions of the leg portions in the respective hooks is prevented by the rotation restricting means.

(8) Further, in accordance with an eighth aspect of the present invention, in order to achieve the object mentioned above, there is provided a combination weighing apparatus as recited in the seventh aspect, wherein the plurality of supporting arms are respectively provided with movement restricting means for restricting respective axial motions of the plurality of supporting arms in the leg portions.

In the combination weighing apparatus in accordance with the eighth aspect structured in the manner mentioned above, since the respective supporting arms are provided with the movement restricting means for restricting the axial motions of the respective supporting arms in the leg portions, the respective hoppers are not disengaged from the respective hooks even when the respective supporting arms are provided in a state of being tilted from a horizontal attitude.

(9) Further, in accordance with a ninth aspect of the present invention, in order to achieve the object mentioned above, there is provided a combination weighing apparatus as recited in the first aspect, wherein the plurality of opening and closing drive bodies have opening and closing operation driving levers rotating for respectively opening and closing the plurality of opening and closing lids, the plurality of opening and closing operation driving mechanisms have rotary shafts of the opening and closing operation driving levers, operating bars respectively operated by the plurality of drive sources, cranks in each of which one end is fixed to the rotary shaft and another end is rotatably mounted to the operating bar, and rotating the rotary shafts due to operations of the operating bars, and blocks provided so as to freely move in an axial direction of the operating bars and to which another ends of the cranks are rotatably attached, and angles of rotation of the plurality of opening and closing lids executed by the respective opening and closing drive levers can be adjusted by adjusting axial positions of the blocks in the operating bars so as to adjust the angles of rotation of the cranks.

(10) Further, in accordance with a tenth aspect of the present invention, in order to achieve the object mentioned above, there is provided a combination weighing apparatus as recited in the ninth aspect, wherein the positions of the blocks can be adjusted via adjusting members capable of being operated from respective external portions of the plurality of hopper supporting arms.

(11) Further, in accordance with an eleventh aspect of the present invention, in order to achieve the object mentioned above, there is provided a combination weighing apparatus as recited in the tenth aspect, wherein the positions of the blocks can be adjusted by adjusting members capable of being rotated from holes respectively provided in the plurality of hopper supporting arms.

(12) Further, in accordance with a twelfth aspect of the present invention, in order to achieve the object mentioned above, there is provided a combination weighing apparatus as recited in the ninth aspect, further comprising adjusting screws engaged with the blocks and capable of adjusting an engagement depth on the basis of a rotational operation from the external portion, wherein the positions of the blocks can be adjusted by the engagement depth of the adjusting screws.

(13) Further, in accordance with a thirteenth aspect of the present invention, in order to achieve the object mentioned above, there is provided a combination weighing apparatus as recited in the ninth aspect, further comprising adjusting screws engaged with the blocks and capable of adjusting an engagement depth on the basis of a rotational operation from the external portion, and urging means for urging the blocks in a direction of moving apart from the front ends of the driving arms so as to position the adjusting screws at fixed positions in the axial direction of the operating bars, wherein the positions of the blocks can be adjusted by the engagement depth of the adjusting screws.

(14) Further, in accordance with a fourteenth aspect of the present invention, in order to achieve the object mentioned above, there is provided a combination weighing apparatus as recited in the first aspect, further comprising a plurality of adjusting plates respectively provided in the plurality of opening and closing lids, and a plurality of engagement protrusions respectively engaged with the plurality of adjusting plates, wherein the plurality of opening and closing operation driving bodies have opening and closing operation driving levers rotating for respectively opening and closing the plurality of opening and closing lids, and the plurality of adjusting plates have engagement slits which the plurality of engagement protrusions are respectively inserted to and taken out from, and respectively rotate the plurality of opening and closing lids in accordance with the respective insertion of the plurality of engagement protrusions.

(15) Further, in accordance with a fifteenth aspect of the present invention, in order to achieve the object mentioned above, there is provided a combination weighing apparatus as recited in the fourteenth aspect, wherein the plurality of adjusting plates are respectively provided so as to freely rotate around the same axes as that of the plurality of opening and closing lids, and are provided with fixing means for respectively fixing the plurality of adjusting plates and the plurality of opening and closing lids.

(16) Further, in accordance with a sixteenth aspect of the present invention, in order to achieve the object mentioned above, there is provided a combination weighing apparatus as recited in the fourteenth aspect, wherein the plurality of adjusting plates are respectively structured such that the plurality of engagement protrusions are provided in the same manner so as to be inserted and taken out, at inlets of the engagement slits in which the plurality of engagement protrusions are respectively made insert and taken out, and are provided with rotatable engagement bodies.

(17) Further, in accordance with a seventeenth aspect of the present invention, in order to achieve the object mentioned above, there is provided a combination weighing apparatus as recited in the fifteenth aspect, wherein the plurality of adjusting plates are respectively structured such that the plurality of engagement protrusions are respectively provided in the same manner so as to be inserted and taken out, at inlets of the engagement slits in which the plurality of engagement protrusions are respectively made insert and taken out, and are provided with rotatable engagement bodies.

(18) Further, in accordance with an eighteenth aspect of the present invention, in order to achieve the object mentioned above, there is provided a combination weighing apparatus as recited in the sixteenth aspect, wherein taper portions expanding outward are provided in both sides of inlet portions in the slits which the plurality of engagement protrusions of the engaging bodies are respectively inserted to and taken out from.

(19) Further, in accordance with a nineteenth aspect of the present invention, in order to achieve the object mentioned above, there is provided a combination weighing apparatus as recited in the seventeenth aspect, wherein taper portions expanding outward are provided in both sides of inlet portions in the slits which the plurality of engagement protrusions of the engaging bodies are respectively inserted to and taken out from.

BEST MODE FOR CARRYING OUT OF THE INVENTION

A description will be given below of embodiments in accordance with the present invention with reference to the accompanying drawings.

First Embodiment

At first, a description will be given of a first embodiment of a combination weighing apparatus in accordance with the present invention with reference to the accompanying drawings.

FIGS. 1 to 17 show a first embodiment of a combination weighing apparatus in accordance with the present invention.

That is, as shown in FIGS. 1 to 6 and the like, a casing 20 is provided in a center space surrounded by a lot of hoppers 130, 130, . . . arranged so as to form a cylindrical shape.

The casing 20 is provided with a cylindrical casing main body 21 in which an upper end and a lower end are opened and a lower half portion is formed so as to have a smaller diameter than that of an upper half portion.

The casing main body 21 is supported by four supporting columns 30, 31, 32 and 33 fixed to a base table (not shown) such as a packaging machine or the like at lower ends.

Figure 3:
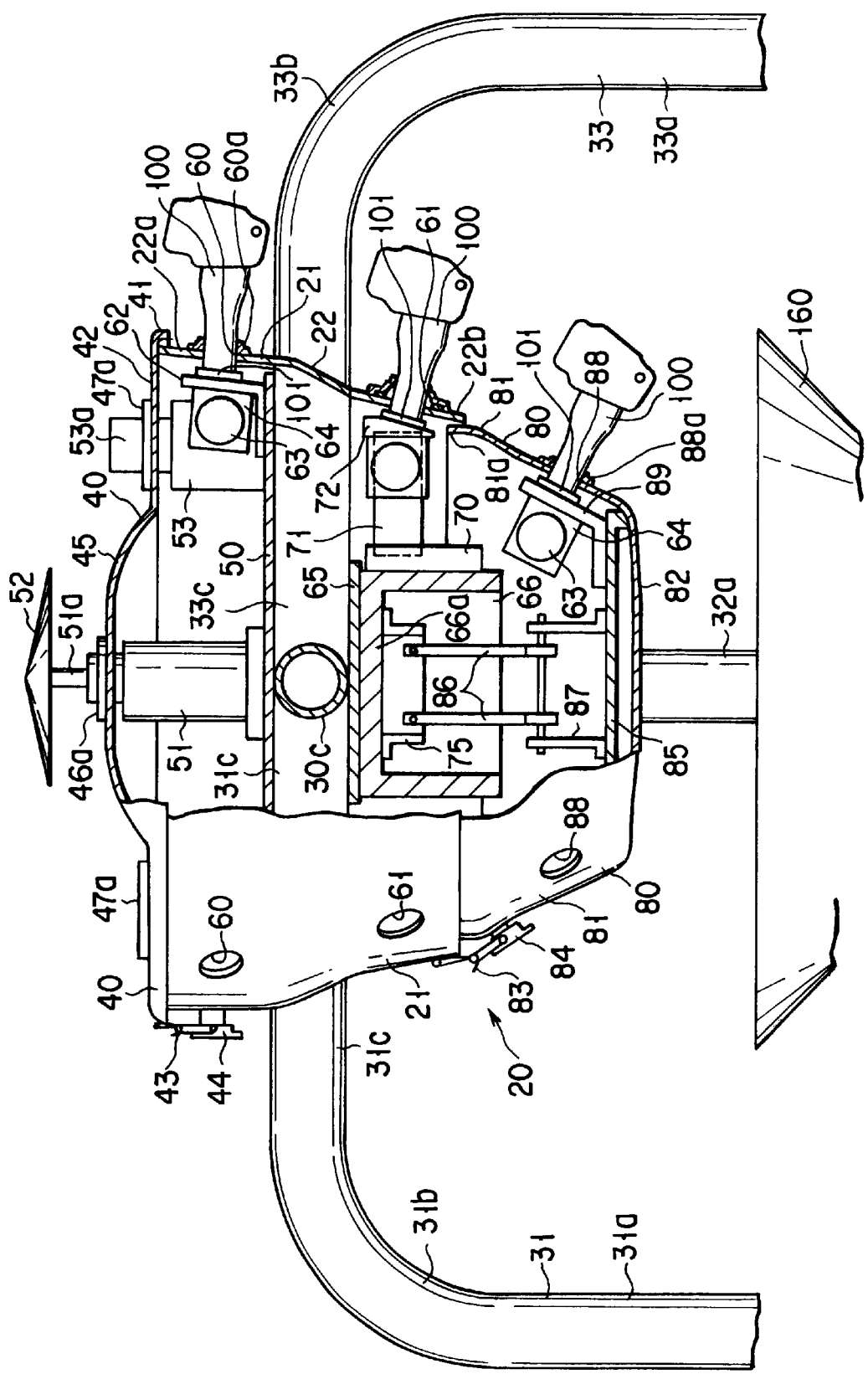
FIG. 3 is a cross view of the combination weighing apparatus shown in FIG. 1 with a breakaway section showing a cross section of the apparatus.
Figure 4:
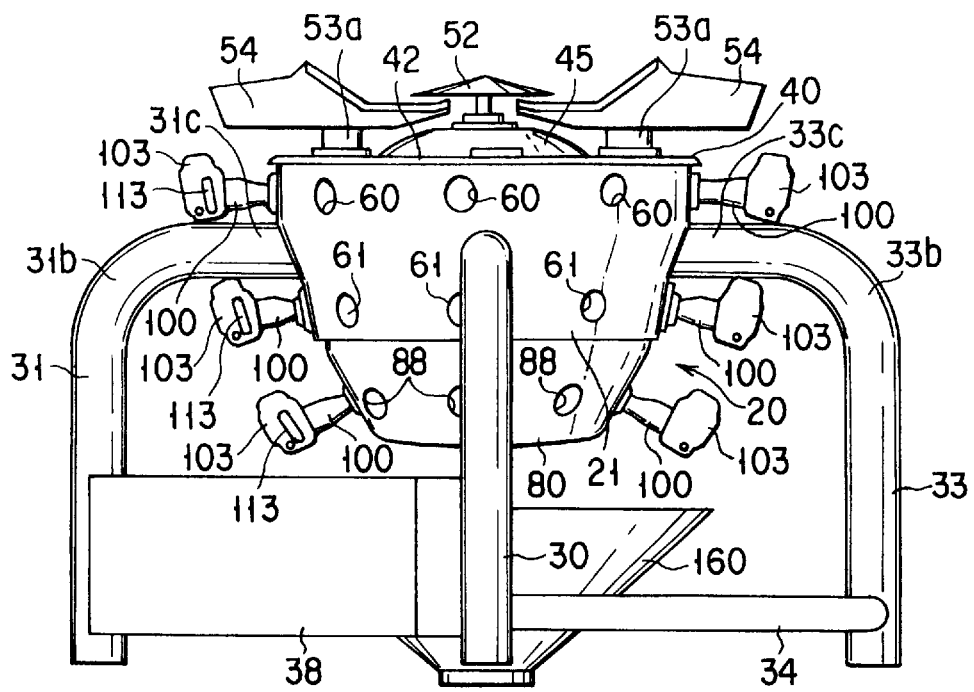
FIG. 4 is a front elevational view of the combination weighing apparatus shown in FIG. 1 with the hoppers removed.
Figure 5:
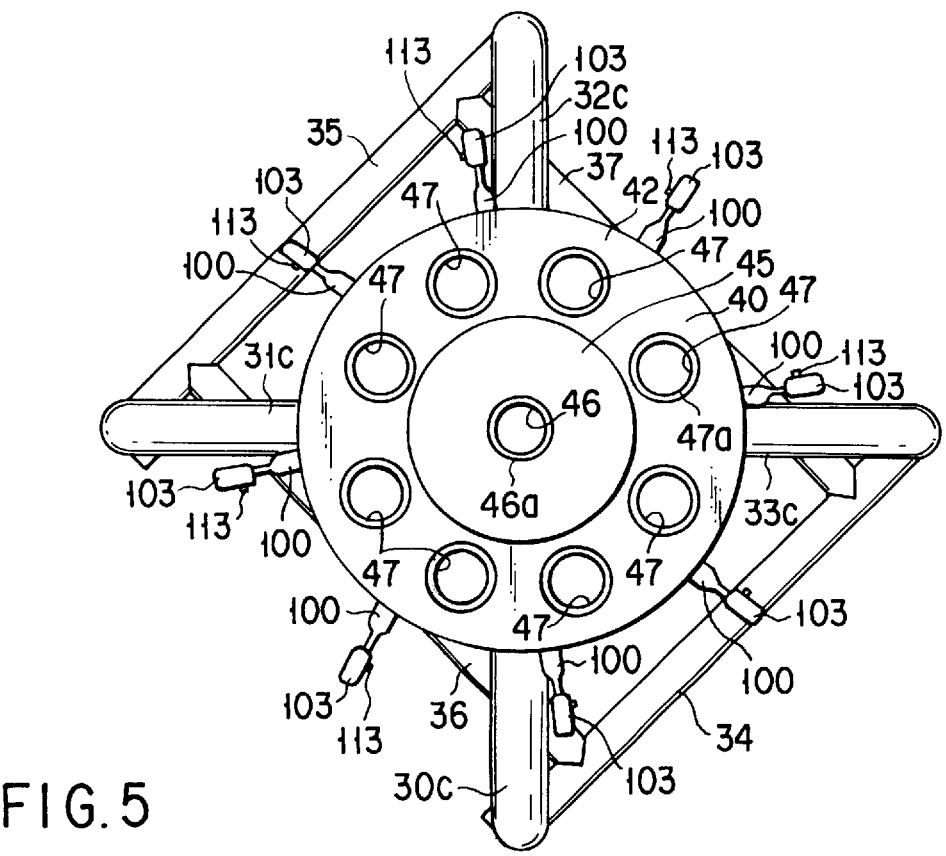
FIG. 5 is a plan view of the apparatus in FIG. 4 with the hoppers removed.

As shown in FIGS. 3 to 5, the respective supporting columns 30, 31, 32 and 33 are constituted by cylindrical vertical portions 30a, 31a, 32a and 33a provided at an interval of 90 degrees in a circumferential direction, fan-shaped curved portions 30b, 31b, 32b and 33b, and horizontal portions 30c, 31c, 32c and 33c.

Further, circular holes (not shown) through which the horizontal portions 30c, 31c, 32c and 33c of the respective supporting columns 30, 31, 32 and 33 are inserted at an interval of 90 degrees in the circumferential direction are provided in a substantially center in a vertical direction, in a peripheral wall portion 22 of the casing main body 21.

Further, front ends of the respective horizontal portions 30c, 31c, 32c and 33c are cut at 45 degrees in both sides.

Four horizontal portions 30c, 31c, 32c and 33c are inserted inward from four holes mentioned above, respectively.

Further, front end portions of four horizontal portions 30c, 31c, 32c and 33c are bonded in a center of an inner portion of the casing main body 21 by a suitable means such as a welding or the like so as to form a cross form.

As shown in FIG. 5, the vertical portions 30a and 33a of adjacent two supporting columns 30 and 33 are connected by a cylindrical horizontal frame 34.

Further, in the same manner, the vertical portions 31a and 32a of adjacent two supporting columns 31 and 32 are connected by a cylindrical horizontal frame 35.

Further, the horizontal frames 34 and 35 are connected by two horizontal frames 36 and 37.

Figure 1:
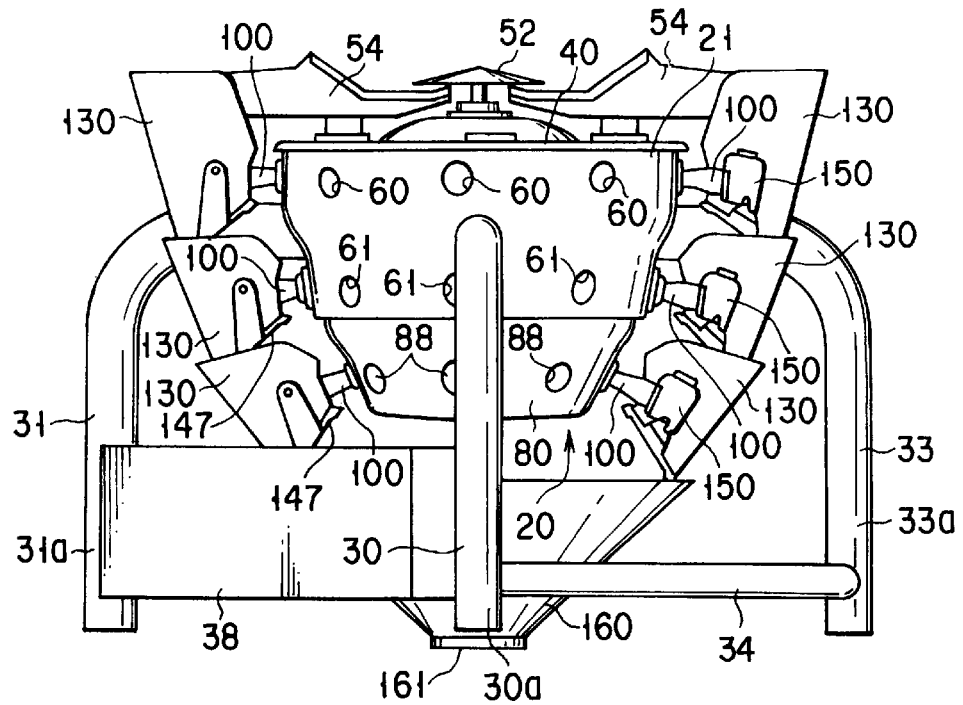
FIG. 1 is a front elevational view showing a first embodiment of a combination weighing apparatus in accordance with the present invention.
Figure 2:
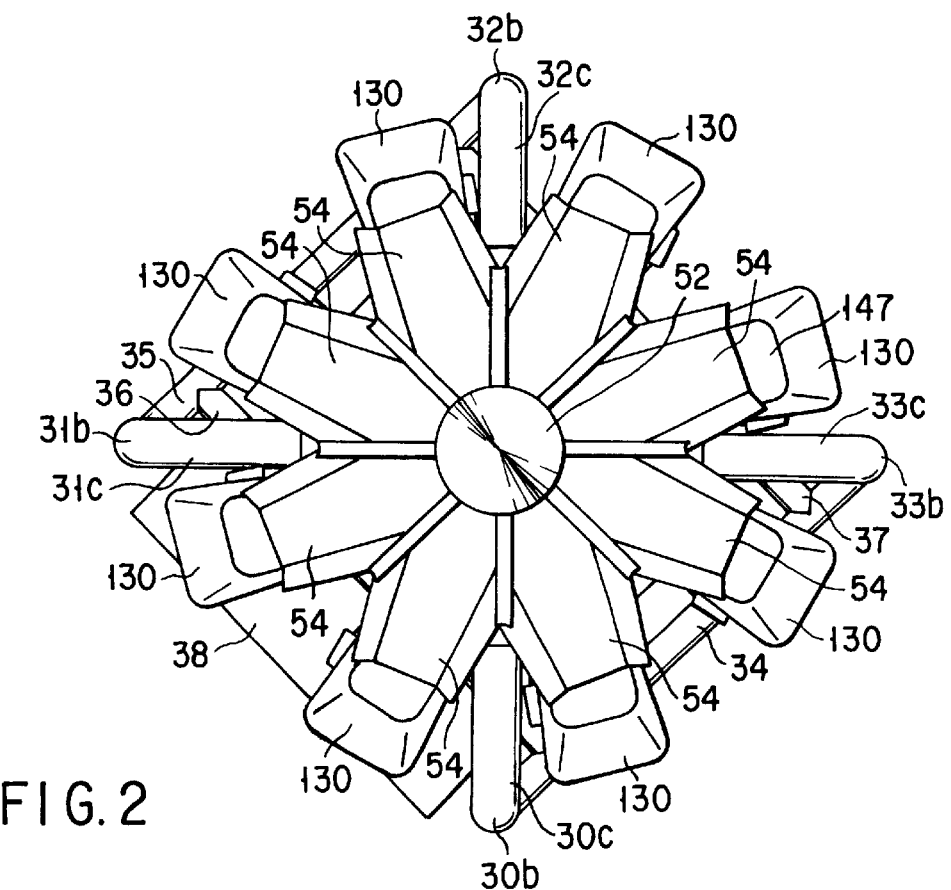
FIG. 2 is a plan view of the combination weighing apparatus shown in FIG. 1.

A control box 38 for controlling operations of respective portions in the combination weighing apparatus is mounted to the horizontal frame 36 (refer to FIGS. 1 and 2).

The casing 20 is constituted by the casing main body 21, a lid body 40 and a bottom plate body 80.

As shown in FIG. 3, an outer peripheral edge portion 41 is protruded downward from an outer periphery of a disc portion 42 in the lid body 40 formed in a disc shape including the disc portion 42 in such a manner as to surround an upper end opening edge portion 22a of the peripheral wall portion 22 in the casing main body 21.

Accordingly, when putting the lid body 40 on the casing main body 21, the outer peripheral edge portion 41 of the lid body 40 surround the upper end opening edge portion 22a of the casing main body 21 at a slight interval from an outer side, so that no water enters within the casing main body 21 even when water washing a whole of the combination weighing apparatus.

Engagement hooks 43 are provided in the outer peripheral edge portion 41 of the lid body 40 at a plurality of portions in a circumferential direction.

Engagement operating devices 44 for hooking the engagement hooks 43 are provided at upper ends of the peripheral wall portion 22 of the casing main body 21.

Then, by operating the engagement operating devices 44 so as to take out the engagement hooks 43, it is possible to lift up the lid body 40 upward from the casing main body 21 so as to take out the same.

A spherical surface portion 45 swelling upward in a spherical surface shape is provided in a center of the disc portion 42 of the lid body 40.

As shown in FIG. 5, a circular hole 46 is provided in a center of the spherical surface portion 45.

Further, a lot of (eight shown in FIG. 5, in the case of this first embodiment) circular holes 47, 47, . . . are respectively provided in a circumferential direction, in the disc portion 42 on an outer periphery of the spherical surface portion 45, at uniform intervals.

Hole edge portions 46a, 47a, 47a, . . . protruding upward are provided in the holes 46, 47, 47, . . . , respectively.

As shown in FIG. 3, a disc-like base plate 50 is fixed to an upper surface of the horizontal portions 30c, 31c, 32c and 33c of four supporting columns 30, 31, 32 and 33 bonded within the casing main body 21 in a cross shape by a suitable means such as a welding or the like.

A rotation driving motor 51 is mounted to a central upper surface of the base plate 50, in correspondence to the center hole 46 of the lid body 40.

A rotary shaft 51a of the rotation driving motor 51 protrudes upward from the center hole 46 of the lid body 40.

A circular umbrella-shaped dispersion table 52 is detachably mounted to an upper end of the rotary shaft 51a.

This dispersion table 52 integrally rotates with the rotary shaft 51a.

Vibrating devices 53 are respectively mounted side by side in a circumferential direction on the upper surface of the base plate 50, in correspondence to the respective holes 47, 47, . . . arranged in a cylindrical direction of the disc portion 42 of the lid body 40 at a uniform interval.

Vibration shafts 53a of the respective vibrating devices 53 protrude upward from the respective holes 47 in the disc portion 42 of the lid body 40.

As shown in FIG. 2, radial feeders 54, 54, . . . receiving the subject to be weighed which is dropped down and supplied from the center dispersion table 52 are detachably mounted to the upper ends of the respective vibration shafts 53a in a radial manner so as to surround the dispersion table 52.

Accordingly, the subject to be weighed which is dropped and supplied to the radial feeders 54, 54, . . . from the dispersion table 52 is sequentially moved forward to an outer portion in a radial direction due to vibration of the radial feeders 54, 54, . . . so as to be dropped down from the front ends thereof.

A rubber packing (not shown) is attached to each of a hole edge portion 46a of the hole 46 and a hole edge portion 47a of the hole 47 so as to prevent the subject to be weighed and the water at a time of cleaning from entering within the lid body 40.

Circular arm insertion holes 60 and 61 arranged in correspondence to the respective radial feeders 54, 54, . . . at the uniform interval in the circumferential direction in an upper side and a lower side of the horizontal portions 30c, 31c, 32c and 33c of the supporting columns 30, 31, 32 and 33 are provided in the peripheral wall portion 22 of the casing main body 21 so as to form two stages.

Arm supporting plates 62 facing to the respective arm insertion holes 60 are stood from the upper surface of the base plate 50, in correspondence to the respective arm insertion holes 60 disposed in the upper side of the peripheral wall portion 22 of the casing main body 21.

Figure 6:
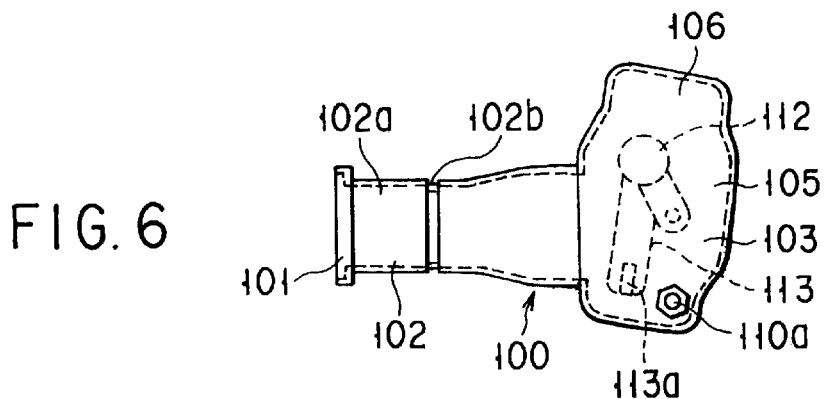
FIG. 6 is a front elevational view showing hopper supporting arms of the combination weighing apparatus shown in FIG. 1.
Figure 7:
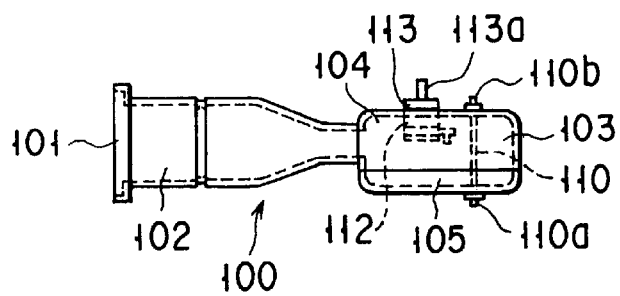
FIG. 7 is a plan view of the hopper supporting arms shown in FIG. 6.
Figure 8:
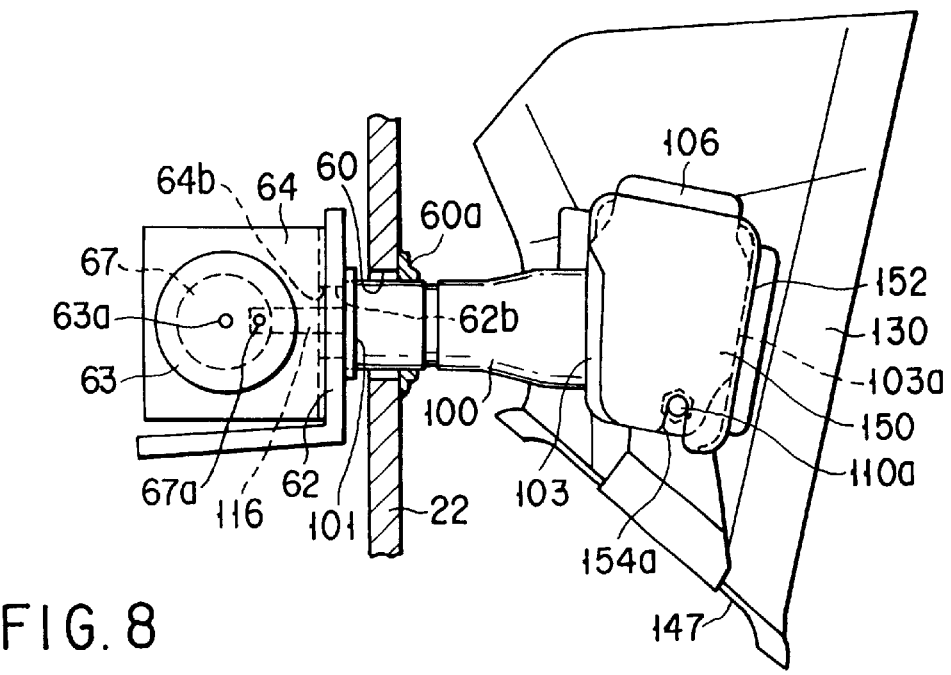
FIG. 8 is a front elevational view of a state that hoppers (stock hoppers) are attached to the hopper supporting arms shown in FIG. 6.
Figure 9:
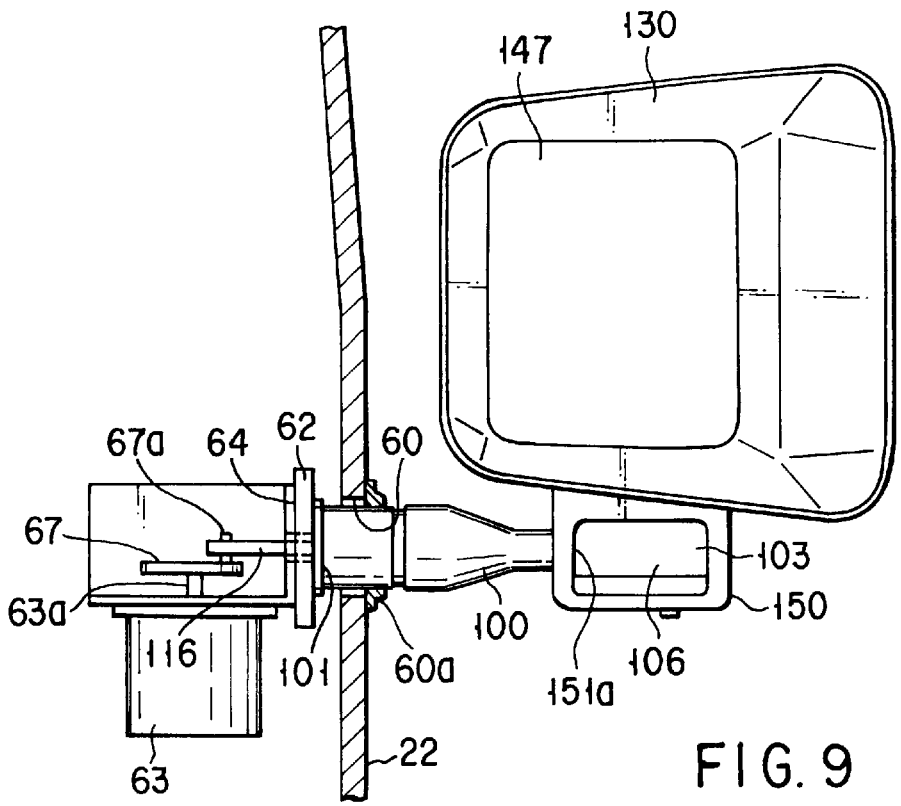
FIG. 9 is a plan view of a state that the hoppers (the stock hoppers) are attached to the hopper supporting arms shown in FIG. 8.

Hollow hopper supporting arms 100 shown in FIGS. 6 and 7 for supporting the hoppers (the stock hoppers) 130 and opening and closing the opening and closing lid are fixed to respective outer surfaces of the arm supporting plates 62 due to a screwing operation of flange portions 101 thereof, in such a manner as to radially protrude outward from the respective arm insertion holes 60 in the upper side of the peripheral wall portion 22 of the casing main body 21 as shown in FIGS. 8 and 9.

A base portion of an arm portions 102 in each of the hopper supporting arms 100 is formed in a cylindrical shape, and a little gap with respect to the arm inserting hole 60 of the peripheral wall portion 22 in the casing main body 21 is sealed by a rubber packing 60a so as to prevent the subject to be weighed and the water at a time of cleaning from entering into the inner portion.

An opening and closing operation driving motor (a drive source) 63 for opening and closing each of opening and closing lids 147 in the respective hoppers 130 is mounted to an inner surface of each of the arm supporting plates 62 by a motor mounting frame 64.

As shown in FIG. 3, a disc-like base plate 65 is fixed to the lower surfaces of the horizontal portions 30c, 31c, 32c and 33c of four supporting columns 30, 31, 32 and 33 bonded within the casing main body 21 in a cross shape by a suitable means such as a welding or the like.

Upper bottom portions 66a of the hollow polygonal cylindrical bodies 66 corresponding to the number of the radial feeders 54 are fixed to a center of a lower surface in the base plate 65 by a suitable means such as a screwing or the like.

Figure 10:
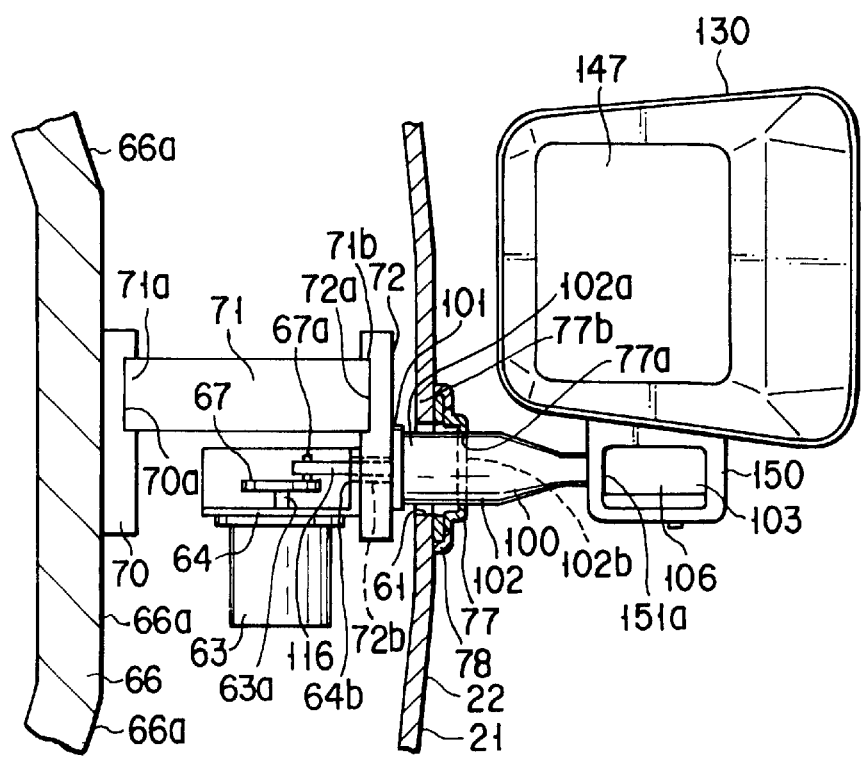
FIG. 10 is a front elevational view of a state that hoppers (weighing hoppers) are attached to the hopper supporting arms shown in FIG. 6.

As shown in FIGS. 3 and 10, respective polygonal flat surfaces 66b, 66b, . . . of the hollow polygonal cylindrical bodies 66 have directions corresponding to the respective arm insertion holes 61, 61, . . . in the lower side.

A fixing table 70 is fixed to an outer side in each of the flat surfaces 66b by a suitable means such as a screwing or the like.

A fitting groove 70a in a vertical direction is provided in an outer surface side of the fixing table 70.

A fixed end 71a of a load cell (a weighing device) 71 is fitted and fixed to the fitting groove 70a by a suitable means such as a screwing or the like.

This load cell 71 is supported to the base table 70 in a cantilever manner.

An arm supporting plate 72 is fixed to a free end 71b of each of the load cells 71.

That is, the arm supporting plate 72 is provided with a fitting groove 72a in a vertical direction.

The free end 71b of the load cell 71 is fitted to the fitting groove 72a, and fixed thereto by a suitable means such as a screwing or the like.

The hollow hopper supporting arm 100 for supporting the hopper (the weighing hopper) 130 and opening and closing the opening and closing lid 147 is fixed to an outer surface of the arm supporting plate 72 due to a screwing operation of the mounting flange portion 101 in such a manner as to radially protrude outward from each of the arm insertion holes 61 in the lower side of the peripheral wall portion 22 of the casing main body 21.

As mentioned above, the opening and closing operation driving motor (the drive source) 63 is mounted to the inner surface of the arm supporting plate 72 by the motor mounting frame 64.

Accordingly, the arm supporting plate 72, the hopper supporting arm 100 and the opening and closing operation driving motor 63 are supported to the free end 71b of the load cell 71.

Accordingly, a diameter of the arm insertion hole 61 is set to be minimum so that an edge portion of the arm insertion hole 61 and a base portion 102a of a cylindrical arm portion 102 positioned at the arm insertion hole 61 of the hopper supporting arm 100 have a minimum gap for keeping a non-contact state, even in the case that the hopper supporting arm 100 vertically moves due to a supply and discharge of the subject to be weighed to and from the hopper (the weighing hopper) 130 supported by the hopper supporting arm 100.

In order to prevent the subject to be weighed and the water at a time of cleaning from entering from the gap between the base portion 102a of the arm portion 102 in the hopper supporting arm 100 and the arm insertion hole 61, a front end portion 77a of a bellows-like rubber packing 77 is fitted to an annular groove 102b of the base portion 102a in the arm portion 102.

A flange portion 77b of the rubber packing 77 is pressed by a cup-shaped cover 78, and is fixed to the edge portion of the arm insertion hole 61 in the peripheral wall portion 22 by a suitable means such as a screw or the like.

Since the rubber packing 77 is formed as a bellows portion capable of freely bending in a middle between the flange portion 77b and the front end portion 77a thereof, the arm portion 102 of the hopper supporting arm 100 is not prevented from moving within the arm insertion hole 61 of the base portion 102a due to a charge and discharge of the subject to be weighed to each of the hoppers (the engagement hoppers) 130.

The bottom plate body 80 provided in the side of the lower end opening portion of the casing main body 21 is constituted, as shown in FIG. 3, by a cylindrical peripheral wall portion 81 in which an upper surface is open and a diameter thereof is gradually reduced in a lower side, and a bottom portion 82 sequentially provided from the peripheral wall portion 81 in a curved surface state.

That is, the bottom plate body 80 is formed in an arm shape, and a diameter of the bottom plate body 80 is set to be a little smaller than a diameter of the circular lower end opening edge portion 22b of the casing main body 21 so that an upper end opening edge portion 81a of the peripheral wall portion 81 is received within the lower end opening edge portion 22b of the peripheral wall portion 22 in the casing main body 21 at a little gap.

Engagement hooks 83 are provided at a plurality of portions in the circumferential direction in the lower end opening edge portion 22b of the peripheral wall portion 22 in the casing main body 21.

An engagement operating device 84 for engaging the engagement hook 83 is provided at the upper end of the peripheral wall portion 81 of the bottom plate body 80.

Further, as shown in FIG. 3, by engaging the engagement hook 83 by the engagement operating device 84, the bottom plate body 80 is mounted to the casing main body 21 in a state that the upper end opening edge portion 81a of the bottom plate body 80 is received inside the lower end opening edge portion 22b of the casing main body 21 with a little gap.

Accordingly, no water enters the casing main body 21 or the bottom plate body 80 even when using washing water for the purpose of cleaning.

It is possible to remove the bottom plate body 80 from the casing main body 21 by operating the engagement operating device 84 so as to disengage the engagement hook 83.

A base table 85 is fixed to an inner surface of the bottom portion 82 of the bottom plate body 80.

An upper end of a spring (for example, a power leaf spring) 86 is fixed to a center of the lower surface in the upper bottom portion 66a of the hollow polygonal cylindrical body 66 in the casing main body 21 via a mounting frame body 75.

A lower end of the spring 86 is fixed to a center of an upper surface of the base table 85 in the bottom plate body 80 via a mounting frame body 87.

An elastic force of the spring 86 is set so that the bottom plate body 80 slowly moves downward against a mass thereof at a time of operating the engagement operating device 84 so as to disengage the engagement hook 83.

Circular arm insertion holes 88, 88, . . . are provided in the peripheral wall portion 81 of the bottom plate body 80 side by side in a circumferential direction in correspondence to the respective arm insertion holes 61, 61, . . . of the casing main body 21.

An arm supporting plate 89 is stood from an upper surface of the base table 85 fixed to the bottom plate body 80 in such a manner as to face to each of the arm insertion holes 88 in correspondence to each of the arm insertion holes 88 of the bottom plate body 80.

The hollow hopper supporting arm 100 for supporting the hopper (the memory hopper) 130 and opening and closing the opening and closing lid 147 is fixed to an outer surface of each of the arm supporting plates 89 due to a screwing operation of the mounting flange portion 101 in such a manner as to radially protrude outward from each of the arm insertion holes 88, 88, . . . of the peripheral wall portion 81 in the bottom plate body 80.

The base portion 102a of the arm portion 102 in the hopper supporting arm 100 is formed in a cylindrical shape.

The little gap between the peripheral wall portion 81 of the bottom plate body 80 and the arm insertion hole 88 is sealed by the rubber packing 88a, thereby preventing the subject to be weighed and the water at a time of cleaning from entering to the inner portion.

The opening and closing operation driving motor (the drive source) 63 for opening and closing the opening and closing lid 147 of the hopper 130 is mounted to the inner surface of each of the arm supporting plates 89 by the motor mounting frame 64.

In the casing 20 mentioned above, an outer periphery thereof is not formed in an octagonal shape, for example, even in the case that eight hoppers are mounted in a circumferential direction.

That is, the outer periphery of the casing 20 is formed in a circular cup shape surrounded by a smooth peripheral wall portion constituted by a circular curved surface as a whole, as shown in FIGS. 4 and 5, by the circular lid body 40, the cylindrical casing main body 21 and the cup-shaped bottom plate body 80.

Accordingly, since no angular ridge line portion exists in the outer periphery of the casing 20, the fine mists of the subject to be weighed and the like are hard to be attached and accumulated, and it becomes easy to clean.

Further, since only the hopper supporting arms 100, 100, . . . protrude from the peripheral wall portion of the circular curved surface, a waterproof property is improved.

In this case, there is shown the structure in which the casing 20 is separated into the casing main body 21 and the bottom plate body 80, however, the structure may be made such that these elements are integrally constructed without being separated.

The hopper supporting arm 100 provided so as to form three stages is constituted, as shown in FIGS. 6 and 7, by a hollow pipe-shaped arm portion 102, a mounting flange portion 101 for fixing to a supporting plate integrally protruded from one end of the arm portion 102, and a hollow rectangular parallelepiped head portion (a hopper attaching portion) 103 sequentially provided in another end side of the arm portion 102 so that all of the surfaces have roundness.

Figure 11:
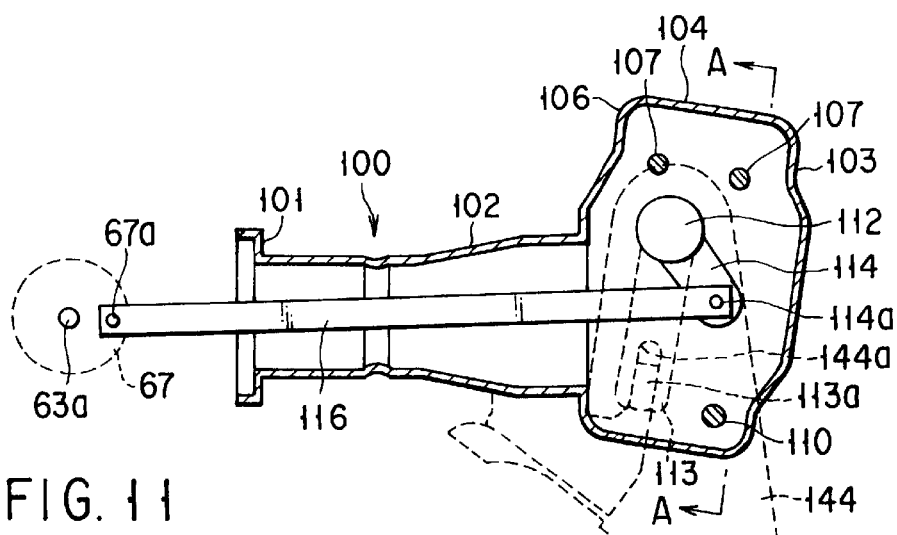
FIG. 11 is a cross sectional view showing the hopper supporting arms shown in FIG. 6 and opening and closing operation driving mechanisms.
Figure 12:
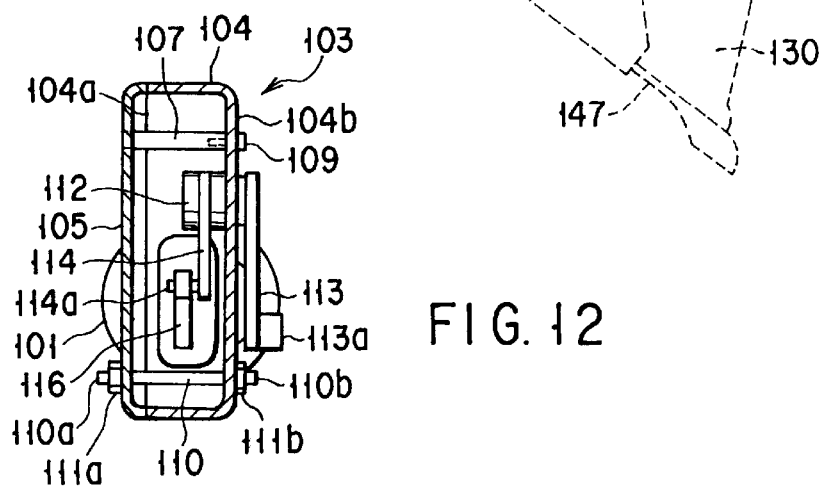
FIG. 12 is a cross sectional view along a line A-A in FIG. 11.

The head portion 103 of the hopper supporting arm 100 mentioned above is integrally protruded from the hollow arm portion 102, as shown in FIGS. 11 and 12, and is constituted by a head portion main body 104 in which a side portion is open, and a side lid 105 mounted to a side opening portion 104a of the head portion main body 104 in a butt manner.

Further, the head portion 103 mentioned above forms a fitting head portion 106 in which a width in a longitudinal direction (a lateral direction in FIG. 11) is narrowed so that an upper end thereof is suitably fitted to a fitting hole 151a (refer to FIG. 16) of an upper surface plate 151 in an engagement hood 150 provided on a side surface of each of the hoppers 130.

A plurality of studs 107 having screw holes at front ends thereof are vertically stood from an inner surface of the side lid 105.

The side lid 105 is fixed to the head portion main body 104 by screwing to the screw holes by the screw 109 for the respective studs 107 from the outer sides of a plurality of corresponding holes 108 to the side wall portion 104b of the head portion main body 104.

In the lower portion of the head portion 103, engagement bolts 110 are engaged with engagement grooves 154a and 155a (refer to FIGS. 14 and 17) of the engagement hood 150 provided on the side surface of the respective hoppers 130, on the same line in the horizontal direction.

In this case, both ends 110a and 110b of the engagement bolt 110 are fastened by nuts from the external portion so as to protrude outward at a fixed length from nuts 111a and 111b in a state of protruding outward from a side wall portion 104b in a vertical direction of the head portion main body 104 and both sides of the side lid 105 in a vertical direction.

A rotary shaft 112 in a horizontal direction is rotatably mounted to the side wall portion 104b of the head portion main body 104.

One end of the rotary shaft 112 protrudes outward from the side wall portion 104b.

In this outward protruding rotary shaft 112, one end of the opening and closing lid driving body 113 is mounted outside the side wall portion 104b of the head portion main body 104 so as to integrally rotate with the rotary shaft 112.

This opening and closing lid driving body 113 is formed in a band plate shape, and an engagement protruding body 113a engaged with an engagement slit 144a (refer to FIG. 17) of a rotary arm 144 in the opening and closing lid 147 of the hopper 130 is protruded from an outer surface in a front end side thereof.

In the inner side of the head portion main body 104, one end of the rotary plate 114 is mounted so as to integrally rotate with the rotary shaft 112.

As shown in FIGS. 8, 9 and 10, a rotary plate 67 is fixed to a drive shaft 63a of the opening and closing operation driving motor 63.

A pin 67a is stood from a position eccentric from a center of rotation of the rotary plate 67.

An operation bar 116 is received within the hollow hopper supporting arm 100.

Further, one end of the operation bar 116 is rotatably mounted to a pin 114a stood from the front end of the rotary plate 114 within the head portion 103.

Further, another end of the operation bar 116 protrudes outward from the arm portion 102.

That is, another end of the operation bar 116 is rotatably mounted to the pin 67a of the rotary plate 67 rotated by the motor 67 through the supporting plate 8 (the supporting plate 72 as shown in FIG. 10 at a center portion, and the hole in the supporting plate 89 at the lowermost state) and the holes 62b (72b) and 64b of the motor mounting frame as shown in FIGS. 8 and 9 at the uppermost stage.

Figure 13:
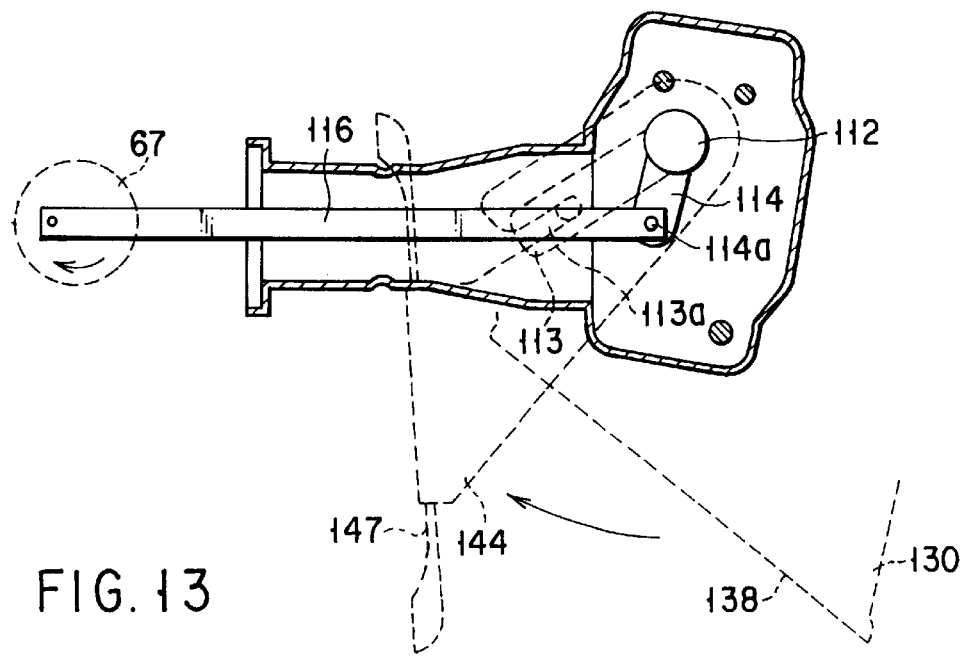
FIG. 13 is a cross sectional view showing the hopper supporting arms shown in FIG. 6 and the opening and closing operation driving mechanisms.
Figure 14:
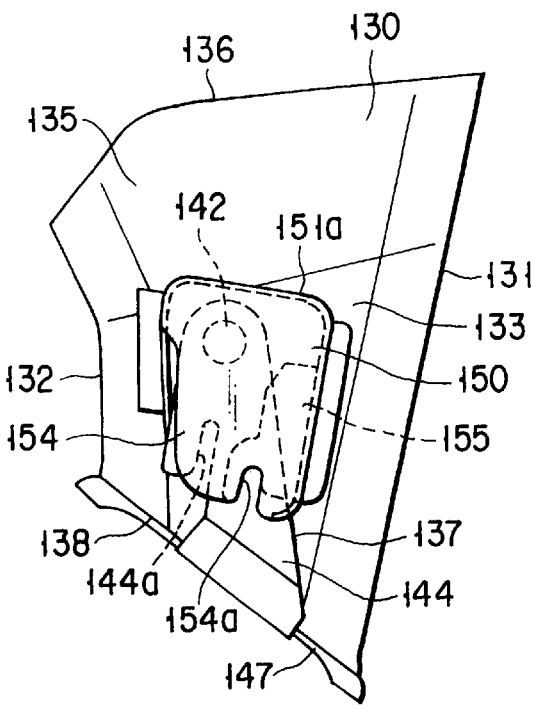
FIG. 14 is a front elevational view showing a hopper employed in the first embodiment of, the combination weighing apparatus in accordance with the present invention.

Accordingly, a rotary motion of the rotary plate 67 due to the rotation of the drive shaft 63a of the opening and closing operation driving motor 63 is converted into a swing (crank) motion within a predetermined angular range of the rotary plate 114 within the head portion 103 and the opening and closing lid driving body 113 outside the head portion 103, as shown in FIGS. 11 and 13.

Further, the rotary plate 114 and the opening and closing lid driving body 112 rotate in a clockwise direction at a predetermined angle due to one rotation of the rotary plate 67, and thereafter rotate in a counterclockwise direction so as to be returned to an original position.

Each of the hoppers 130 is formed in a substantially rectangular conical tube shape obtained by a front surface plate 131, a back surface plate 132 and both side surface plates 133 and 134 with roundness, as shown in FIGS. 14 to 17.

In this case, the front surface plate 131, the back surface plate 132 and both side surface plates 133 and 134 in each of the hoppers 130 are provided with a receiving port 136 for the subject to be weighed at an upper end of an upper half portion 135 gradually expanding upward in a trumpet shape.

Further, both side surface plates 133 and 134 in each of the hoppers 130 are provided with a discharge port 138 at a lower end of a lower half portion 137 in which the front surface plate 131 and the back surface plate 132 gradually come close to each other in a lower side thereof in parallel and vertical directions.

Further, studs 140 and 141 are stood at the same positions on the outer surfaces of both side surface plates 133 and 134, in the upper portion of the lower half portion 137 of each of the hoppers 130.

Two flat-shaped mutually parallel rotary arms 144 and 145 are rotatably mounted to the studs 140 and 141 by supporting shafts 142 and 143.

These two rotary arms 144 and 145 are formed in a triangular wide shape in the lower portions thereof.

Further, these two rotary arms 144 and 145 are integrally connected by a bottom plate 146.

The opening and closing lid 147 closing the discharge port 138 in each of the hoppers 130 is fixed to an upper surface of the bottom plate 146 by a suitable means such as a welding or the like.

An engagement slit 144a in which a lower side is open so that an engagement protruding body 113a of the opening and closing lid driving body 113 provided in the outer surface side of the head portion 103 is inserted from the lower side so as to be engaged when each of the hoppers 130 is supported to the head portion 103 of the hopper supporting arm 100, is provided in one rotary arm (a coupling) 144.

An engagement hood 150 for being covered on the head portion 103 of the hopper supporting arm 100 from the upper side so as to be engaged is mounted to the side surface plate 133 in the lower half portion 137 in each of the hoppers 130 in such a manner as to cover the upper portion of the rotary arm 144 having the engagement slit 144a.

The engagement hood 150 is constituted by an upper surface plate 151, a front surface plate 152, a back surface plate 153 parallel to the front surface plate 152 and a side surface plate 154 on a vertical plane with keeping a roundness.

Further, the engagement hood 150 is formed in a rectangular parallelepiped hollow box shape in which a lower surface is open and a rear surface lower portion is open subsequent thereto.

The upper surface plate 151 of the engagement hood 150 has a fitting hole 151a with roundness at four corners of a rectangle to which the fitting head portion 106 having a small width in the longitudinal direction of the head portion 103 in the hopper supporting arm 100 is inserted.

Further, an engagement groove 154a which the engagement bolt 110a protruded outward in a horizontal direction from one side surface of the head portion 103 in the hopper supporting arm 100 is inserted to and engaged with is provided at a lower end of the side surface plate 154 in the engagement hood 150.

Figure 15:
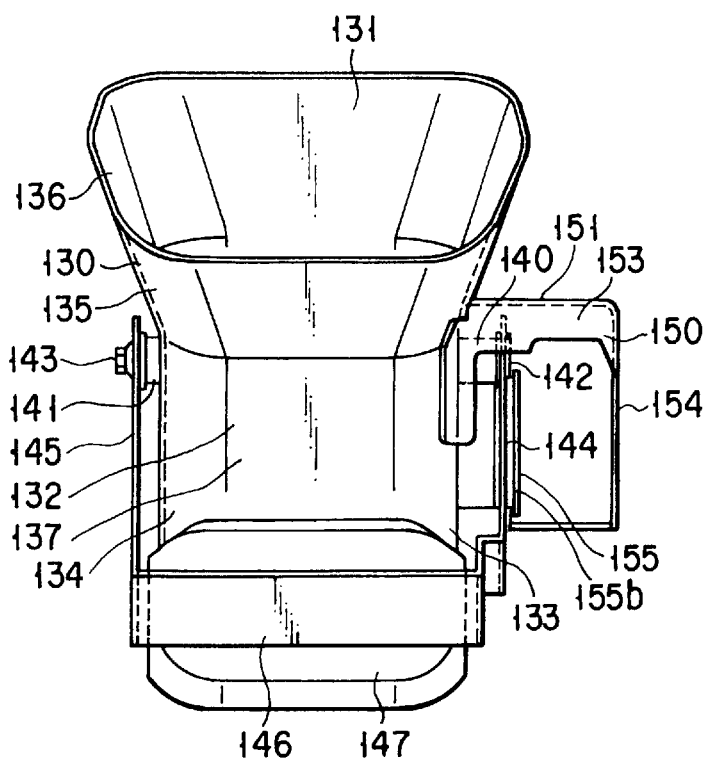
FIG. 15 is a left side elevational view of the hopper shown in FIG. 14.
Figure 16:
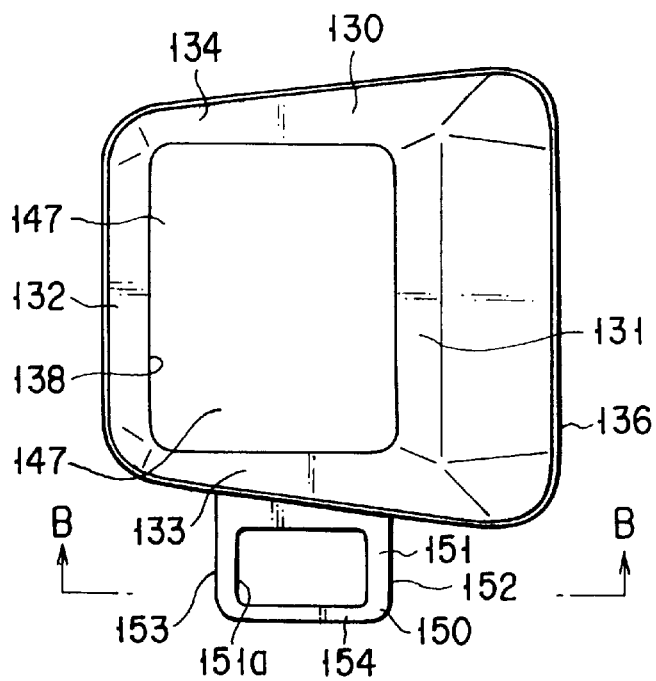
FIG. 16 is a plan view of the hopper shown in FIG. 14.
Figure 17:
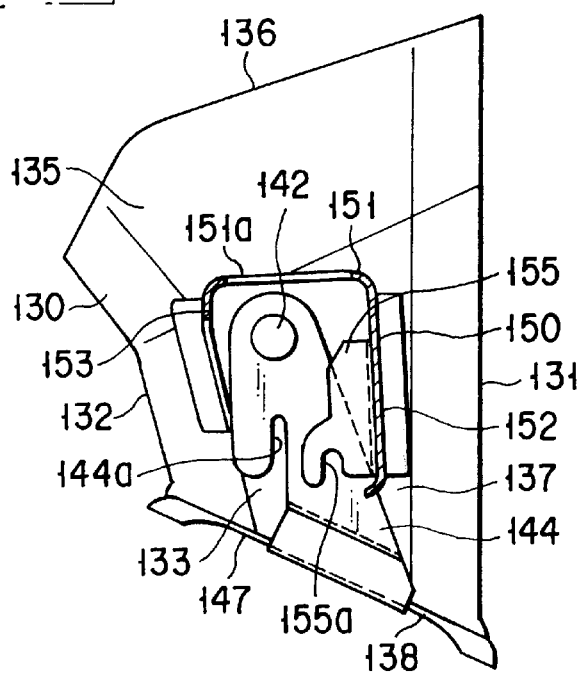
FIG. 17 is a cross sectional view along a line B-B in FIG. 16.

On an inner surface of the front surface plate 152 of the engagement hood 150, as shown in FIGS. 15 and 17, a middle plate 155 is fixed to a portion between the perpendicularly bent mounting plate 155b and the side surface plate 154 in a parallel manner with a predetermined interval capable of receiving the head portion 103 of the hopper supporting arm 100, by a suitable means such as a welding or the like.

At a lower end of the middle plate 155, there is provided an engagement groove 155a which another engagement bolt 110b outward protruded from a position having the same height one the opposite side surface to the head portion 103 in a horizontal direction is inserted to from the lower side and engaged with.

Further, an interval between the inner surface of the front surface plate 152 in the engagement hood 150 and these engagement grooves 154a and 155a is set to be substantially equal to an interval between the front surface 103a of the head portion 103 and the engagement bolts 110a and 110b.

Accordingly, as shown in FIGS. 8, 9 and 10, when covering the engagement hood 150 on the head portion 103 of the hopper supporting arm 100 from the upper side, the fitting head portion 106 is inserted and fitted to the fitting hole 151a of the upper surface plate 151 in the engagement hood 150 from the lower side.

Accordingly, the engagement bolts 110a and 110b protruding outward from both sides of the head portion 103 are respectively inserted into and engaged with the engagement groove 154a of the side surface plate 154 in the engagement hood 150 and the engagement groove 155a of the middle plate 155 from the lower side, and the front surface 103a of the head portion 103 is in a state of being brought into contact with the inner surface of the front surface plate 152 of the engagement hood 150.

Further, the head portion 103 of the hopper supporting arm 100 is mounted in an immobile state that the engagement hood 150 covers the head portion 103 from the outer side, and each of the hoppers 130 is mounted in an immobile state.

Further, it is possible to simply take out the engagement hood 150 from the head portion 103 by lifting up the engagement hood 150.

At a time of mounting the engagement hood 150, the engagement protruding body 113a of the opening and closing lid driving body 113 provided in the external portion from the side wall portion 104b of the head portion 103 is inserted to and engaged with the engagement slit 144a of the rotary arm (the coupling) 144 in the opening and closing lid 147 from the lower side.

Further, at a time of mounting the engagement hood 150, the rotary shaft 112 of the opening and closing lid driving body 113 and the supporting shaft 142 of the rotary arm 144 are arranged so as to coincide on the same axis.

Accordingly, in correspondence that the opening and closing operation driving body 113 rotates within a predetermined angle due to the rotation of the opening and closing operation driving motor 63 in the manner mentioned above, as shown in FIG. 13, the rotary arm (the coupling) 144 and the opening and closing lid 147 rotates within a predetermined angle, whereby the discharge port 138 of each of the hoppers 130 is opened and closed.

Further, since the rotary shaft 112 and the supporting shaft 142 are arranged on the same axis, the opening and closing lid 147 is further smoothly rotated.

Figure 39:
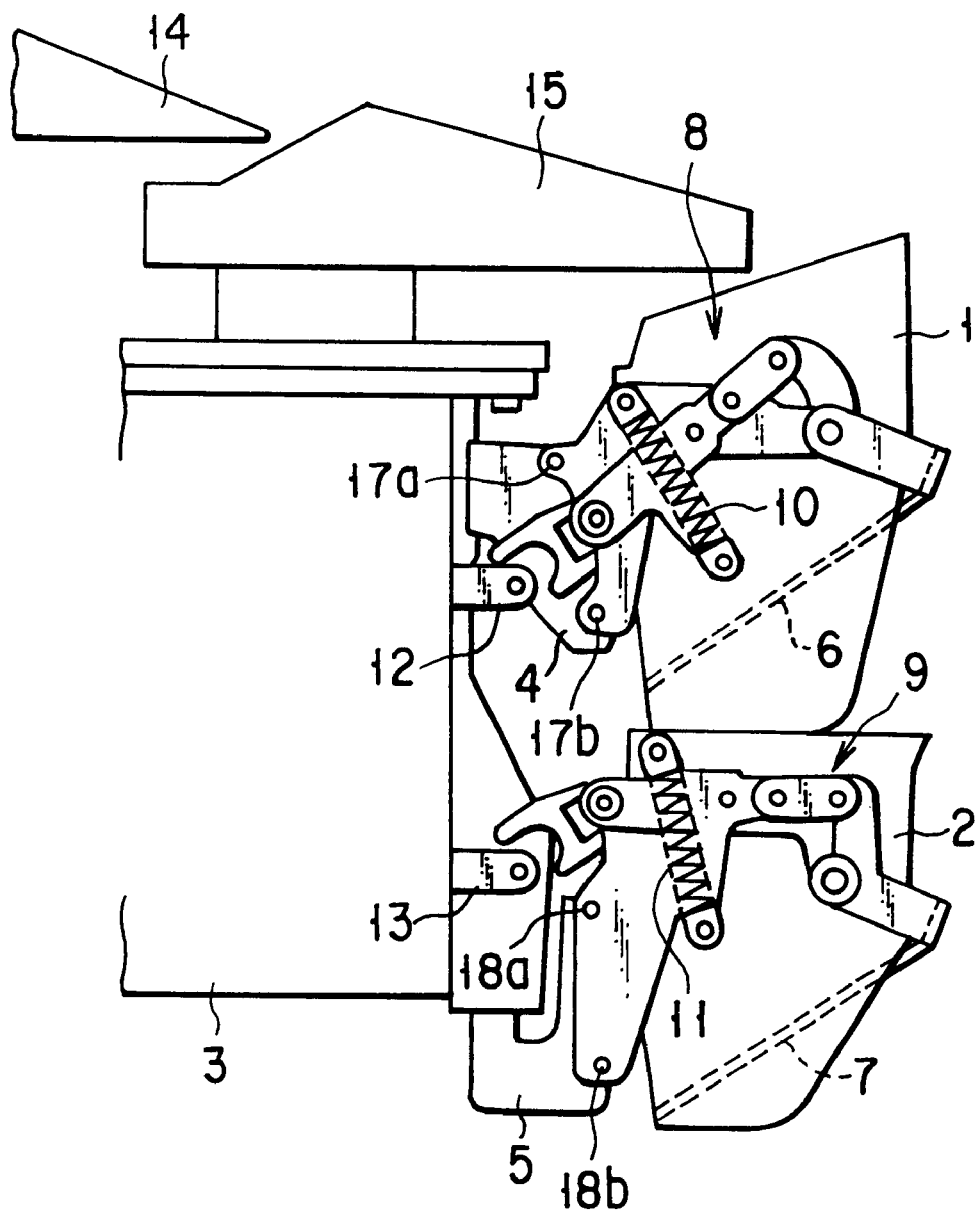
FIG. 39 is a view for explaining a schematic structure of a conventional combination weighing apparatus.

Accordingly, when the structure is made such that the opening and closing lid 147 is opened and closed in accordance with one rotation of the rotary plate 67 of the motor 63, it is unnecessary that a restoring spring is provided outside the hopper for the purpose of closing the opening and closing lid as shown in FIG. 39, the subject to be weighed and the fine powder mists are not attached or accumulated on the portion or the like, and a cleaning performance is significantly improved.

Further, since the rotary plate 114, the operation bar 116, the rotary shaft 112 and the like constituting the opening and closing mechanism are sealed within the hollow hopper supporting arm 100, only the opening and closing operation driving body 113 is exposed to the external portion, and the opening and closing lid 147 is integrally rotated with the rotation of the opening and closing operation driving body 113 so as to be opened and closed, it is not necessary that the complex opening and closing link mechanism as shown in FIG. 39 is provided outside the hopper, so that the subject to be weighed, the fine powder mists and the like are not attached or accumulated to the complex mechanism portion, a cleaning performance is significantly improved, and it is significantly easy to clean.

Further, the supporting portion for supporting the hopper to the casing and the structure driving portion for applying the driving force from the drive source opening and closing the opening and closing lid of the hopper have been separately provided in the conventional art, however, since the support of the hopper and the opening and closing operation of the opening and closing lid are integrated by the hopper supporting arm 100, it is sufficient that the arm insertion holes 60, 61 and 88 having a small minimum size through which the hopper supporting arm 100 passes (a minimum size within a range that the supporting arm 100 can move due to the receiving and discharging of the subject to be weighed in the case of the supporting arm 100 of the weighing hopper) are only provided in the casing 20, the subject to be weighed and the fine powder mists are attached and accumulated thereto at a significantly reduced amount, a cleaning performance is significantly improved, and it is significantly easy to clean, in comparison with the case that a lot of large-size complex holes are provided and the supporting structure of the hopper and the opening and closing operation driving structure are separately provided as in the conventional art.

As shown in FIG. 1, a truncated conical funnel-shaped collecting chute 160 for collecting the subject to be weighed discharged from the hopper (the memory hopper) 130 at the lowermost stage is fixed to the horizontal frames 34, 35, 36 and 37 below the casing 20 so as to be coaxial with the casing 20.

The subject to be weighed drops down to the packaging machine from a drop port 161 of the collecting chute 160.

In this case, the hopper 130 at the uppermost stage is called the "stock hopper".

Further, the subject to be weighed supplied by a conveyor (not shown) or the like is supplied to the radial feeder 54 around the dispersion table 52 from the rotating dispersion table 52 disposed in a center portion of the above, and thereafter drops down within the corresponding hopper (the stock hopper) 130 at the uppermost stage from the front end of the vibrating radial feeder 54 so as to be received therein.

The opening and closing lid 147 of the stock hopper 130 is opened by driving the opening and closing operation driving motor 63.

Accordingly, the subject to be weighed dropping within the stock hopper 130 and received therein drops within the hopper (the weighing hopper) 130 below the same so as to be received therein.

Thereafter, the opening and closing lid 147 of the stock hopper 130 is closed by driving the opening and closing operation driving motor 63, and at this timing, the subject to be weighed is again supplied from the radial feeder 54.

Further, the subject to be weighed received in the hopper (the weighing hopper) 130 at the second stage is weighed by the weighing device (the load cell 70), and thereafter, the opening and closing lid 147 of the weighing hopper is opened by driving the opening and closing operation driving motor 63, whereby the subject to be weighed drops within the hopper (the memory hopper) 130 at the lowermost stage and received therein.

Thereafter, the opening and closing lid 147 of the weighing hopper 130 is closed by driving the opening and closing operation driving motor 63, and at this timing, the subject to be weighed is again supplied from the stock hopper 130.

The mass of a lot of subjects to be weighed within the hopper (the memory hopper) 130 at the second stage is combined and added by a control portion, and is selected to a combination having a total mass which is equal to a set mass or close thereto.

Further, the respective opening and closing lids 147 in a plurality of selected memory hoppers are opened by driving the respective opening and closing operation driving motors 63, whereby the subjects to be weighed within the respective memory hoppers 130 drop to the collecting chute 160 so as to be collected to one unit and thereafter is packaged by the packaging machine disposed below the same.

Thereafter, the opening and closing lid 147 of the memory hopper 130 is closed by driving the opening and closing operation driving motor 63, and at this timing, the subject to be weighed is again supplied from the weighing hopper 130.

Figure 18:
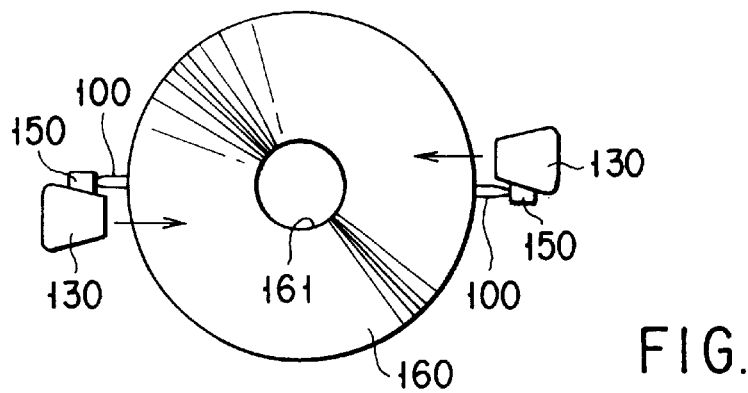
FIG. 18 is a view for explaining a positional relation between two opposing stock hoppers.

As shown in FIG. 18, since the hopper 130 is supported to the side portion of the hopper supporting arm 100 radially protruding out from the outer periphery of the circular casing by the engagement hood 150, the hopper 130 is arranged at an offset position deflected sideward from the circular radial direction of the collecting chute 160.

Accordingly, in the case the number of the memory hoppers 130 arranged in a circumferential direction is an even number, two opposing memory hoppers 130 and 130 respectively supported to two hopper supporting arms 100 and 100 in the same diametrical direction are combined and selected, and the subject to be weighed is simultaneously discharged to the collecting chute 160, the subjects to be weighed from two memory hoppers 130 and 130 drop within the collecting chute 160 in a state of brushing against each other, so that it is possible to previously prevent the subjects to be weighed from being damaged due to the collision of the subjects to be weighed with each other.

As described above, in accordance with the first embodiment of the present invention, there is provided the combination weighing apparatus having a plurality of hoppers to which the subject to be weighed is supplied, and the casing in which the drive sources for opening and closing the opening and closing lids opening and closing the discharge ports of the hoppers are arranged in the inner side, characterized by the couplings mounted to the opening and closing lids of the hoppers rotatably provided in the hoppers, the hollow hopper supporting arms in which the opening and closing operation driving mechanisms for transmitting the driving operation from the drive sources are sealed, and the opening and closing operation driving bodies provided on the outer surface of the hopper attaching portions at the front ends of the hopper supporting arms in an exposing state, driven by the sealed opening and closing operation driving mechanisms and engaging with the couplings due to the attachment of the hoppers so as to open and close the opening and closing lids of the hoppers.

In the combination weighing apparatus structured in the manner mentioned above, when attaching the hopper to the hopper attaching portion at the front end of the hopper supporting arm, the exposed opening and closing operation driving body exposed to the outer surface of the hopper attaching portion is engaged with the coupling provided in the hopper opening and closing lid, the opening and closing operation driving body is driven by the opening and closing operation driving mechanism sealed within the hopper supporting arm due to the driving force from the drive source within the casing, and the opening and closing lid of the hopper is opened and closed, so that it is not necessary that the complex opening and closing link mechanism, the restoring spring and the like are provided in an outward exposed state.

Accordingly, in the combination weighing apparatus, the subject to be weighed, the fine powder mists and the like are less attached and accumulated thereto, the cleaning performance is significantly improved, unhygienic conditions are not generated in the case that the subject to be weighed is the food, and it is easy to clean the whole of the combination weighing apparatus.

Further, in the combination weighing apparatus in accordance with the first embodiment, since two objects comprising the support of the hopper and the drive of the hopper opening and closing lid can be achieved by only one hopper supporting arm, it is not necessary that the hopper supporting mechanism and the opening and closing operation driving mechanism are separately protruded from the casing, the structure becomes simple, and accordingly, the disadvantage that the subject to be weighed and the fine powder mists are attached and accumulated thereto is reduced.

Further, in the combination weighing apparatus in accordance with the first embodiment of the present invention, since the rotary shaft of the coupling mounted to the opening and closing lid of the hopper and the rotary shaft of the opening and closing operation driving body are arranged on the same axis, the opening and closing lid can be further smoothly opened and closed.

Further, in the combination weighing apparatus in accordance with the first embodiment of the present invention, the drive source is constituted by a motor, and the opening and closing operation driving mechanism is constituted by a link mechanism connected to the motor.

Further, in the combination weighing apparatus in accordance with the first embodiment of the present invention, there is provided the combination weighing apparatus having a plurality of weighing hoppers to which the subject to be weighed is supplied, the weighing devices for weighing the mass of the subject to be weighed received in the weighing hoppers, the drive sources opening and closing the opening and closing lids for opening and closing the discharge ports of the weighing hoppers, and the casing in which the weighing devices and the drive sources are arranged in the inner side, characterized in that the combination weighing apparatus is provided with the couplings mounted to the opening and closing lids of the hoppers rotatably provided in the hoppers, the hollow hopper supporting arms protruded outward from the insertion holes provided in the casing and in which the opening and closing operation driving mechanisms for transmitting the driving operation from the drive sources are sealed, and the opening and closing operation driving bodies provided on the outer surface of the hopper attaching portions at the front ends of the supporting arms in an exposing state, driven by the sealed opening and closing operation driving mechanisms and engaging with the couplings due to the attachment of the hoppers so as to open and close the opening and closing lids of the hoppers, and the weighing devices are structured such that the fixed ends of the weighing devices are fixed to the inner side of the casing, and the drive sources and the hollow hopper supporting arms are fixed to the free ends of the weighing devices.

In the combination weighing apparatus structured in the manner mentioned above, when attaching the hopper to the hopper attaching portion at the front end of the hopper supporting arm, the opening and closing operation driving body exposed to the outer surface of the hopper attaching portion is engaged with the coupling provided in the hopper opening and closing lid, the opening and closing operation driving body is driven by the opening and closing operation driving mechanism sealed within the hopper supporting arm due to the driving force from the drive source within the casing, and the opening and closing lid of the hopper is opened and closed, so that it is unnecessary that the complex opening and closing link mechanism, the restoring spring and the like are provided in the outer portion in an exposed state.

Accordingly, in the combination weighing apparatus, the subject to be weighed, the fine powder mists and the like are less attached and accumulated thereto, and the cleaning performance is significantly improved, whereby the disadvantage on the food sanitation is hard to be generated in the case that the subject to be weighed is the food, and it is easy to clean the whole of the combination weighing apparatus.

Further, in the combination weighing apparatus in accordance with the first embodiment structured in the manner mentioned above, since two objects comprising the support of the hopper and the drive of the hopper opening and closing lid can be achieved by only one hopper supporting arm, it is not necessary that the hopper supporting mechanism and the opening and closing operation driving mechanism are separately protruded from the casing, the structure becomes simple, and accordingly, the disadvantage that the subject to be weighed and the fine powder mists are attached and accumulated thereto is reduced.

Further, in the combination weighing apparatus in accordance with the first embodiment structured in the manner mentioned above, since the hopper supporting arm and the drive source are fixed to the free end of the weighing device, it is possible to open and close the opening and closing lid of the hopper, and it is possible to weigh the subject to be weighed within the weighing hopper.

Second Embodiment

Next, a description will be given of a second embodiment of a combination weighing apparatus in accordance with the present invention with reference to the accompanying drawings.

FIGS. 19 to 38 show a combination weighing apparatus in accordance with the second embodiment of the present invention.

Figure 19:
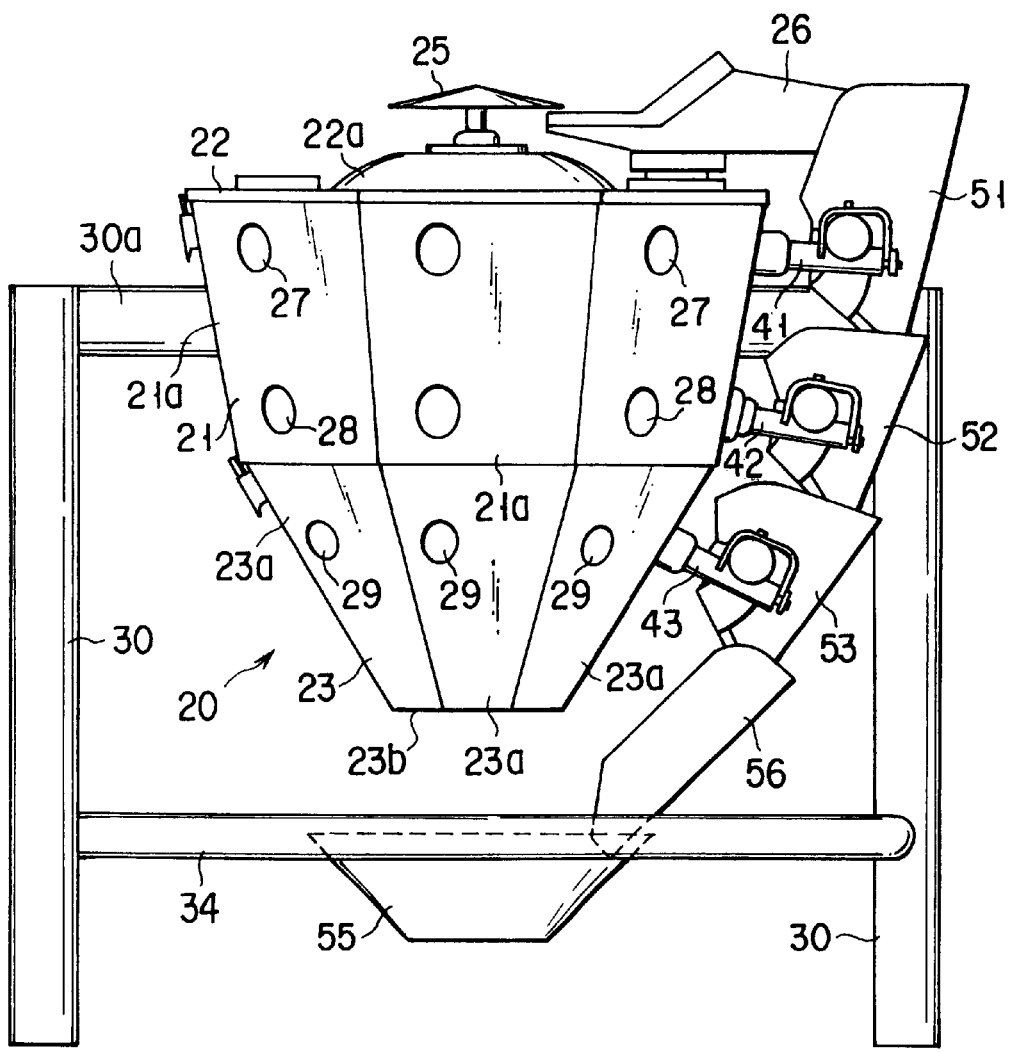
FIG. 19 is a front elevational view showing a second embodiment of a combination weighing apparatus in accordance with the present invention.

As shown in FIG. 19, the casing 20 is constituted by a polygonal tube-like main body 21 open to upper and lower portions, having a little smaller diameter in a lower side and corresponding to a number of the heads, an upper lid 22 covered on an upper surface opening portion of the main body 21 so as to be detachably fixed thereto, and a bottom plate body 23 detachably fixed in a state that an upper end portion is slightly inserted from a lower surface opening portion of the main body 21.

In this case, the bottom plate body 23 is formed in a polygonal plate shape in which an upper surface is opened.

The main body 21 is structured such that a lower width constituting the polygon is narrowed, and is constituted by a plurality of flat-shaped side walls 21a, 21a, . . .

Further, the bottom plate body 23 is constituted by flat-shaped side walls 23a, 23a, . . . in which a lower width constituting the polygon is narrowed, and polygonal flat-shaped bottom plates 23b.

Figure 20:
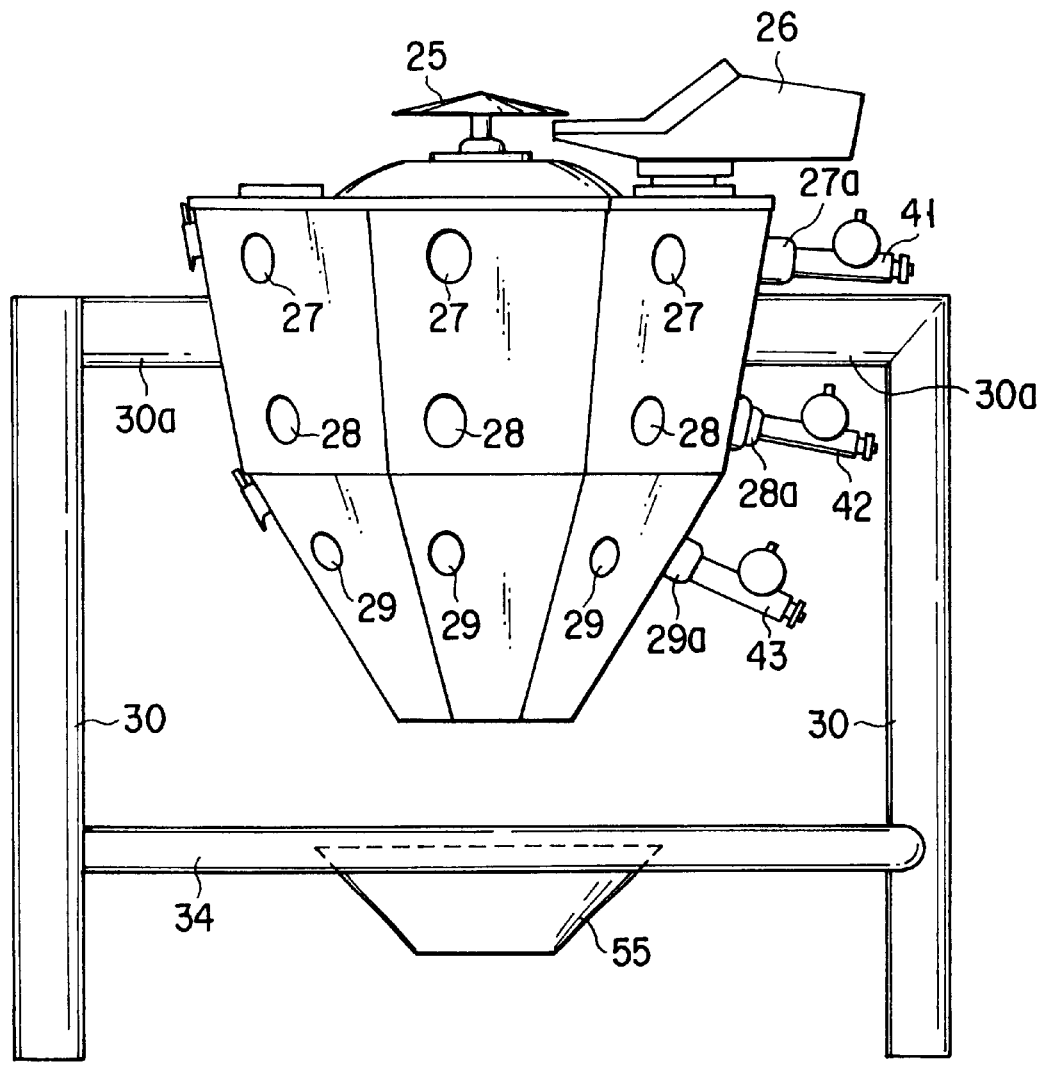
FIG. 20 is a front elevational view showing a state that hoppers in FIG. 19 are taken out.
Figure 21:
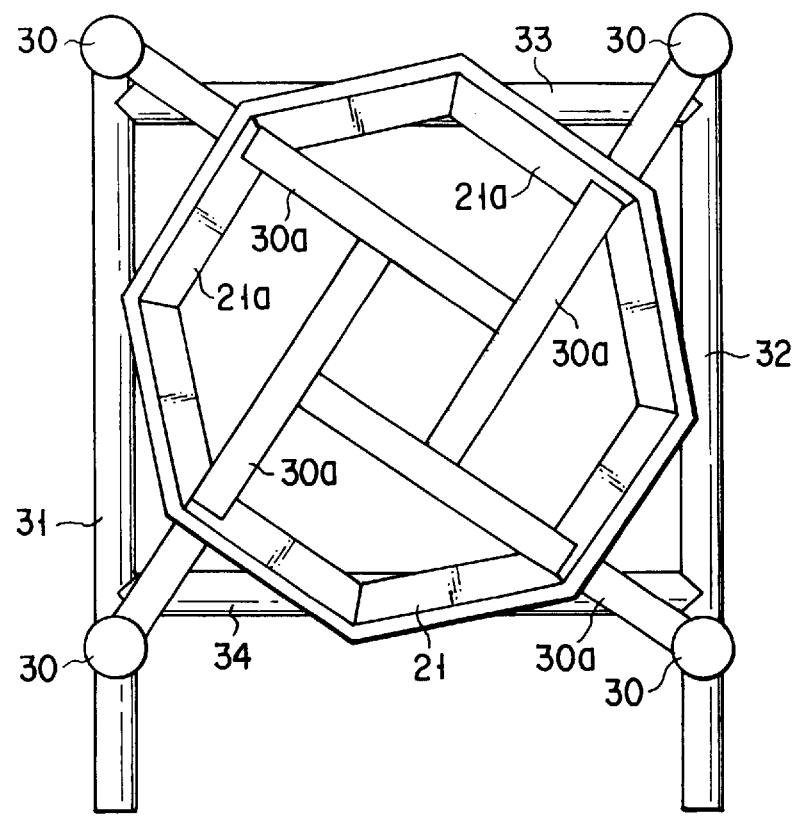
FIG. 21 is a plan view showing a supporting structure of a casing in FIG. 19.
Figure 22:
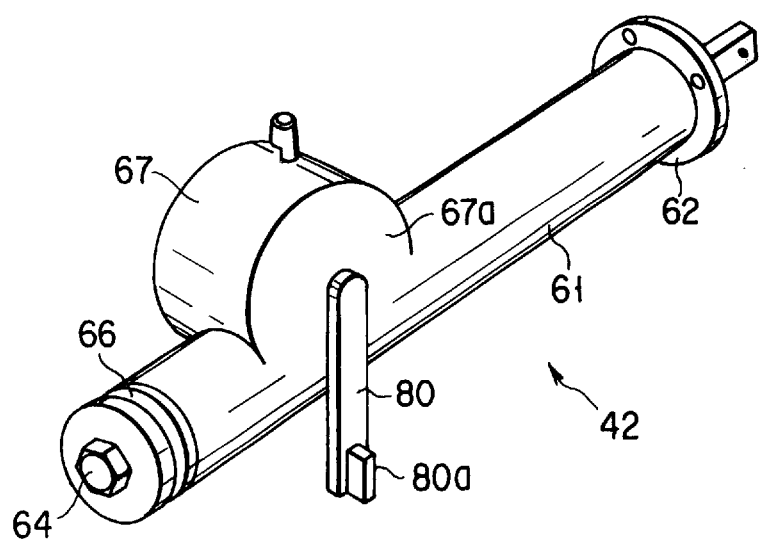
FIG. 22 is a perspective view showing a supporting arm employed in the second embodiment of the combination weighing apparatus in accordance with the present invention.

As shown in FIGS. 20 and 21, horizontal portions 30a, 30a, . . . at upper ends of four vertical supporting columns 30, 30, . . . are inserted to the side walls 21a of the main body 21 in the casing 20.

Further, the horizontal portions 30a, 30a, . . . are fixed to the side walls 21a of the main body 21 in the casing 20 by the inserting portions, whereby the main body 21 are supported by four supporting columns 30, 30, . . .

Four horizontal portions 30a, 30a, . . . mentioned above are connected and fixed to each other so as to vertically cross to each other in a # shape at the center of the main body 21.

The lower portions of four supporting columns 30, 30, . . . are connected and fixed to each other by the horizontal frames 31, 32, 33 and 34.

A circular bevel-shaped dispersion table 25 is provided in an upper portion of an expansion portion 22a in a center of the upper lid 22 of the casing 20.

A lot of radial feeders 26, 26, . . . are radially provided around the dispersion table 25 (in FIGS. 19 and 20, only one is exemplified).

Circular arm insertion holes 27 and 28 arranged in correspondence to the respective radial feeders 26, 26, 26, . . . in an upper side and a lower side of the horizontal portions 30a, 30a, . . . at the upper ends of the supporting columns 30, 30, . . . are provided in the respective side wall portions 21a, 21a, . . . of the casing main body 21 so as to form upper and lower two stages.

Further, an arm insertion hole 29 is provided in each of the side walls 23a, 23a, . . . of the bottom plate body 23.

As shown in FIG. 20, supporting arms 41, 42 and 43 are respectively provided so as to radially protrude outward from the respective arm insertion holes 27, 28 and 29.

Further, a stock hopper 51, a weighing hopper 52 and a memory hopper 53 are detachably mounted to the respective supporting arms 41, 42 and 43.

Accordingly, the subject to be weighed dropped down from the front end of the radial feeder 26 is supplied to the stock hopper 51, and thereafter is supplied to the weighing hopper 52 from the stock hopper 51.

Further, the subject to be weighed supplied to the weighing hopper 52 is supplied to the memory hopper 53 from the weighing hopper 52.

A circular funnel-shaped collecting chute 55 is mounted below the casing 20 by the horizontal frames 31, 32, 33 and 34.

In this case, a guide chute 56 is detachably mounted to each of the memory hoppers 53, whereby the subject to be weighed supplied from a plurality of memory hoppers 53, 53, . . . combined and selected in the manner mentioned below drops down to the collecting chute 55 through the guide chutes 56, 56, . . . (in FIG. 19, the supporting arms 41, 42 and 43, the stock hoppers 51, the weighing hoppers 52, the memory hoppers 53 and the guide chutes 56 are respectively represented by only one elements).

A base portion of the supporting arm 41 at the uppermost stage for supporting the stock hopper 51 is fixed to a base table (not shown) provided within the main body 21 of the casing 20.

Further, the supporting arm 43 at the lowermost stage for supporting the memory hopper 53 is fixed to a base table (not shown) provided within the bottom plate body 23 of the casing 20.

The stock hopper 51 and the memory hopper 53 are both fixed in the arm insertion holes 27 and 29 by waterproof covers 27a and 29a.

On the contrary, the supporting arm 42 for supporting the weighing hopper 52 in the middle portion is fixed to a free end side of a weighing device (not shown) having a fixed end fixed to a base table (not shown) fixed within the main body 21 of the casing 20.

Further, in order not to prevent the supporting arm 42 from vertically moving within the arm insertion hole 28, the waterproof cover 28a is elastically structured, for example, as a bellows structure.

FIGS. 22 to 26 show a structure of the supporting arm 42 (the other supporting arms 41 and 43 have the same structure as that of the supporting arm 42).

The supporting arm 42 is provided with a hollow cylindrical arm portion 61 in which a side of a base portion is open, and a mounting flange 62 is protruded from the base portion.

Figure 25:
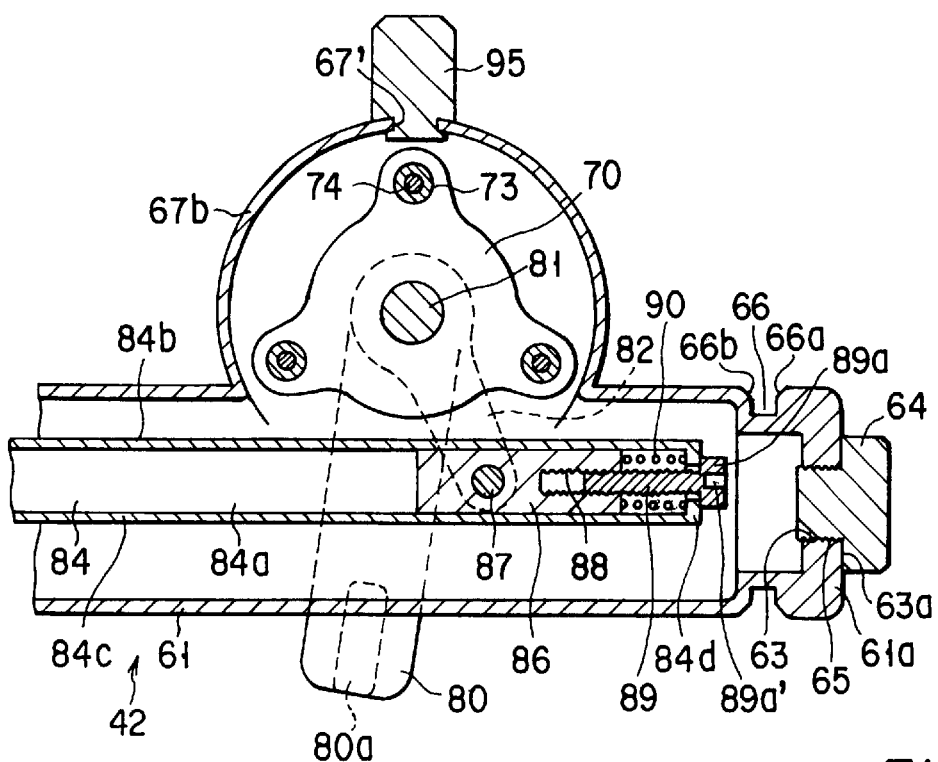
FIG. 25 is a cross sectional view showing a main portion in the supporting arm shown in FIG. 22.

As shown in FIG. 25, a screw hole 63 is provided in a center of a front end surface 61a of the arm portion 61, however, the screw hole 63 is normally closed by a lid screw 64 being meshed therewith.

A waterproof ring 65 is fitted and attached to an annular recess portion 63a provided in an outer side portion of the screw hole 63.

Accordingly, when screwing the lid screw 64, it is possible to prevent the water from entering into the inner portion from the screw hole 63 by the waterproof ring 65 at a time of water washing.

An annular groove 66 restricting a motion in an axial direction of the arm portion 61 due to an engagement of a first leg plate 112 of a hook 111 in the hopper 52 mentioned below is provided near a front end of the arm portion 61.

Taper portions 66a and 66b for making the first leg plate 112 of the hook 111 in the hopper 52 be easily inserted is provided in both sides of the annular groove 66.

A cylindrical expansion body 67 is protruded from the arm portion 61 in a side of a base portion from the annular groove 66 in such a manner as to integrally expand out above the leg portion 61.

The cylindrical expansion body 67 is formed in a cylindrical shape with a bottom in which one end surface is open, and is connected to a lateral direction perpendicularly crossing to the arm portion 61.

Figure 26:
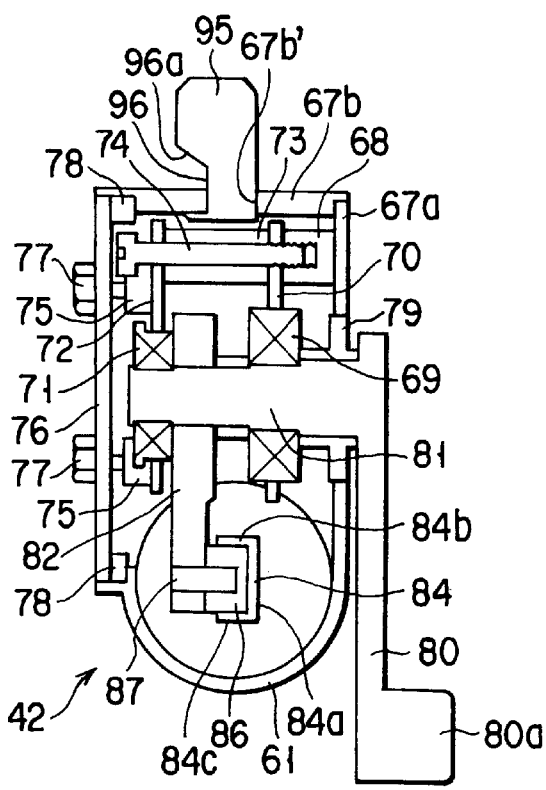
FIG. 26 is a cross sectional view showing a main portion in the supporting arm shown in FIG. 22.

Further, as shown in FIG. 26, a bottom plate 67a of the cylindrical expansion body 67 exists on the same plane as a tangential line of a circumference in a side of the cylindrical arm portion 61.

Further, a cylinder portion 67b of the cylindrical expansion body 67 further protrudes outward from an opposite side surface of the arm portion 61, and is integrally formed with the arm portion 61 in a state that a lower portion of the cylinder portion 67b rides on the arm portion 61.

As shown in FIG. 26, a plurality of studs 68 are protruded from an inner surface of the bottom plate 67a of the cylindrical expansion body 67.

A first holding plate 70 holding a first bearing 69 and a second holding plate 72 holding a second bearing 71 are fixed so as to be parallel to each other.

In this case, a front end of a continuous thread stud 74 is screwed to the stud 68 from a hole of the second holding plate 72 through a hole of a hollow cylindrical spacer 73, whereby the first holding plate 70 and the second holding plate 72 are fixed via the spacer therebetween so as to be parallel to each other.

A stud 75 having a screw hole is mounted to the second holding plate 72.

A disc lid 76 is mounted by screwing screws 77 and 77 with screw holes in the studs 75 from the holes in the disc lid 76 closing the opening portion 67c of the cylinder portion 67b in the cylindrical expansion body 67.

In this case, a ring-shaped packing 78 is gripped between the disc lid 76 and the opening portion 67c for the purpose of waterproofing.

A shaft 81 of an opening and closing operation driving lever 80 for opening and closing the opening and closing lid 125 of the hopper 52 is rotatably held by the first and second bearings 67 and 71.

This shaft 81 protrudes outward from the bottom plate 67a through a hole of the waterproofing disc-like packing 79 attached to the hole of the bottom plate 67a in the cylindrical expansion body 67, and is fixed to a band plate-shaped opening and closing operation driving lever 80 which is in parallel to the bottom plate 67*a*.

An engagement protrusion 80*a* in a longitudinal direction of the opening and closing operation driving lever 80 engaged with the opening and closing lid 125 mentioned below is protruded from a lower end of the opening and closing operation driving lever 80.

An upper end of the crank 82 is fixed to the shaft 81.

An operation lever 84 is received within the arm portion 61 in a state that one end protrudes outward.

The operation bar 84 is constituted by a band plate 84*a* and side plates 84*b* and 84*c* perpendicularly bent in both sides of the band plate 84*a*, and has a U-shaped cross section.

Figure 23:
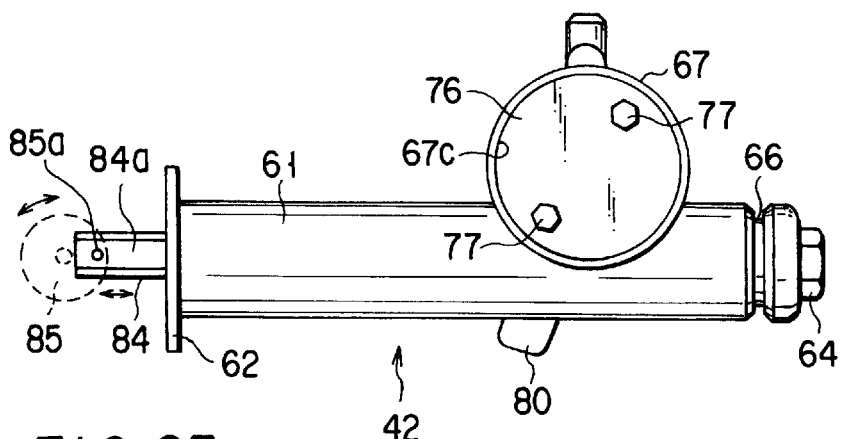
FIG. 23 is a front elevational view of the supporting arm shown in FIG. 22.
Figure 24:
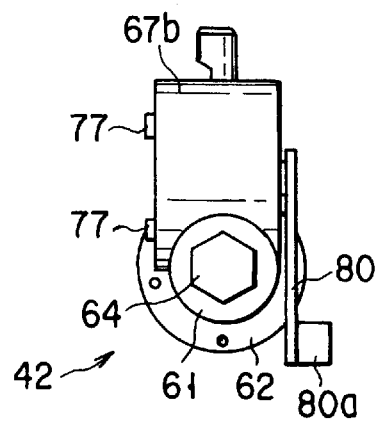
FIG. 24 is a right side elevational view of the supporting arm shown in FIG. 22.

Further, as shown in FIG. 23, one end of the band plate 84*a* is rotatably mounted to a pin 85*a* of a rotary plate 85 rotated by an opening and closing operation driving motor (not shown) provided in the main body 21 of the casing 20.

In another end side of the operation bar 84, as shown in FIGS. 25 and 26, a rectangular parallelepiped block 86 is received between both side plates 84*b* and 84*c* in such a manner as to freely move in a longitudinal direction along the band plate 84*a*.

A lower end portion of the crank 82 in which an upper end portion is fixed to the shaft 81 is rotatably mounted to a pin 87 stood from one end side of the block 86.

As shown in FIG. 25, a screw hole 88 is provided on an end surface of another end of the block 86 in a longitudinal direction.

Further, an adjustment screw 89 inserted from a hole in an edge plate 84*d* provided in another end of the operation bar 84 is meshed with the screw hole 88.

A coil spring 90 is received within both side plates 84*b* and 84*c* of the operation bar 84 so as to surround the adjustment screw 89.

The coil spring 90 is structured such that one end thereof presses an end surface of the block 86 and another end thereof presses an inner surface of the edge plate 84*d*, whereby the coil spring 90 urges the block 86 in a direction apart from the edge plate 84*d*.

Accordingly, a head portion 89*a* of the adjustment screw 89 is always in a state of being brought into contact with the edge plate 84*d*, whereby the block 86 is always positioned at the same position which is determined on the basis of a screwing depth of the adjustment screw 89.

Accordingly, as shown in FIG. 23, when the rotary plate 85 rotates by the opening and closing operation driving motor, the operation bar 84 oscillates within the arm portion 61.

Further, in correspondence to an oscillating motion of the operation bar 84, the crank 82 integrally rotates around the shaft 81 together with the shaft 81.

Accordingly, in accordance with an oscillating motion of the operation bar 84, the opening and closing operation driving lever 80 integrally rotates with the shaft 81 at a predetermined angle and in a clockwise direction, and thereafter rotates in a counterclockwise direction so as to be returned to an initial position.

Therefore, the opening and closing lid 125 of each of the hoppers mentioned below can be opened and closed.

In this case, by taking out the lid screw 64 from the screw hole 63 at the front end of the arm portion 61, inserting a wrench having a polygonal column-shaped front end or the like from the screw hole 63 so as to engage with a polygonal hole 89*a*' of a head portion 89*a* in the adjustment screw 89, and rotating the adjustment screw 89 so as to adjust a screwing length of the block 89 to the screw hole 88 of the block 86, thereby adjusting a position of the block 86, it is possible to adjust an angle of the crank 82 (and the opening and closing operation driving lever 80).

Accordingly, it is possible to adjust so that the opening and closing lid 125 securely closes the discharge port of the hopper 51.

A hole 67*b*' is provided in a center of an upper portion of the cylinder portion 67*b* in the cylindrical expanding body 67.

Further, a cylindrical engagement projection 95 for engaging with an engagement hole 117 of an upper plate 113 in a hook 111 of the hopper 52 mentioned below is fixed due to a caulking at a lower end portion thereof, in such a manner as to protrude upward from the hole 67*b*'.

The cylindrical engagement projection 95 is provided with a notch 96 in an opposite side to the bottom plate 67*a* of the cylindrical expansion body 67.

Further, a flat taper portion 96*a* inclined so as to recess to a center side of the engagement projection 95 is provided in an upper portion of the notch 96.

In this case, since the structure of the upper supporting arm 41 and the lower supporting arm 43 is absolutely the same as that of the supporting arm 42 mentioned above, a description thereof will be omitted.

FIGS. 27 to 30 show the weighing hopper 52 (the other hoppers 51 and 53 are different from the weighing hopper 52 only in a point of an expanding degree of the upper portion of the hopper main body, but have the absolutely same structure in the other points).

That is, the hopper 52 is provided with the hopper main body 100, the opening and closing lid 125 opening and closing the discharge port of the hopper main body 100 and the hook 111 engaging and disengaging the hopper main body 100 with and from the supporting arm 42 mentioned above.

The hopper main body 100 is formed in a substantially quadrangular pyramid tube shape in which a front surface plate 101, a back surface plate 102 and both side surface plates 103 and 104 are connected with roundness.

Further, the hopper main body 100 is provided with a receiving port 106 for the subject to be weighed at an upper end of an upper half portion that the front surface plate 101, the back surface plate 102 and both side surface plates 103 and 104 gradually expand upward in a trumpet shape.

Further, the hopper main body 100 is provided with a discharge port 108 at a lower end of a lower half portion in which both side surface plates 103 and 104 are in parallel to each other and the front surface plate 101 and the back surface plate 102 gradually come close to each other.

In the upper portion of the hopper lower half portion, a band plate 110 is fixed by a suitable means such as a welding or the like so as to wind around an outer surface from the side surface plate 103 along the back surface plate 102 and the side surface plate 104.

Figure 28:
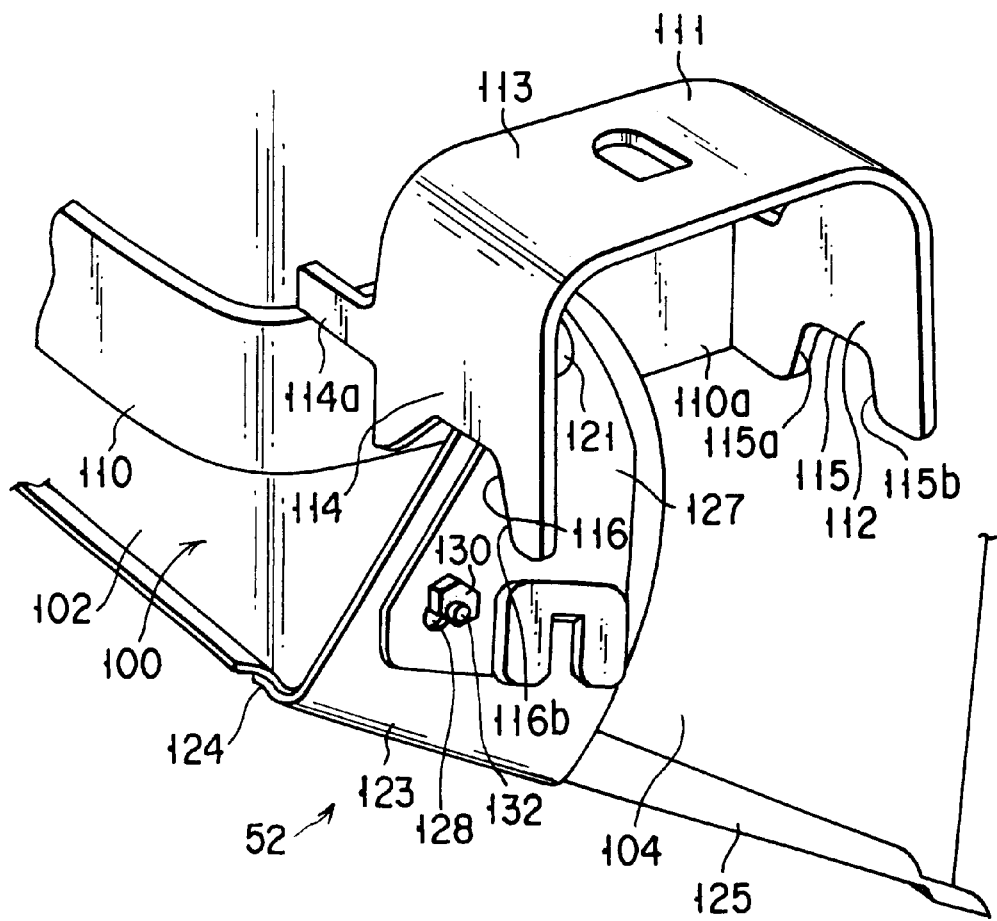
FIG. 28 is a perspective view showing a main portion in the hopper shown in FIG. 27.
Figure 29:
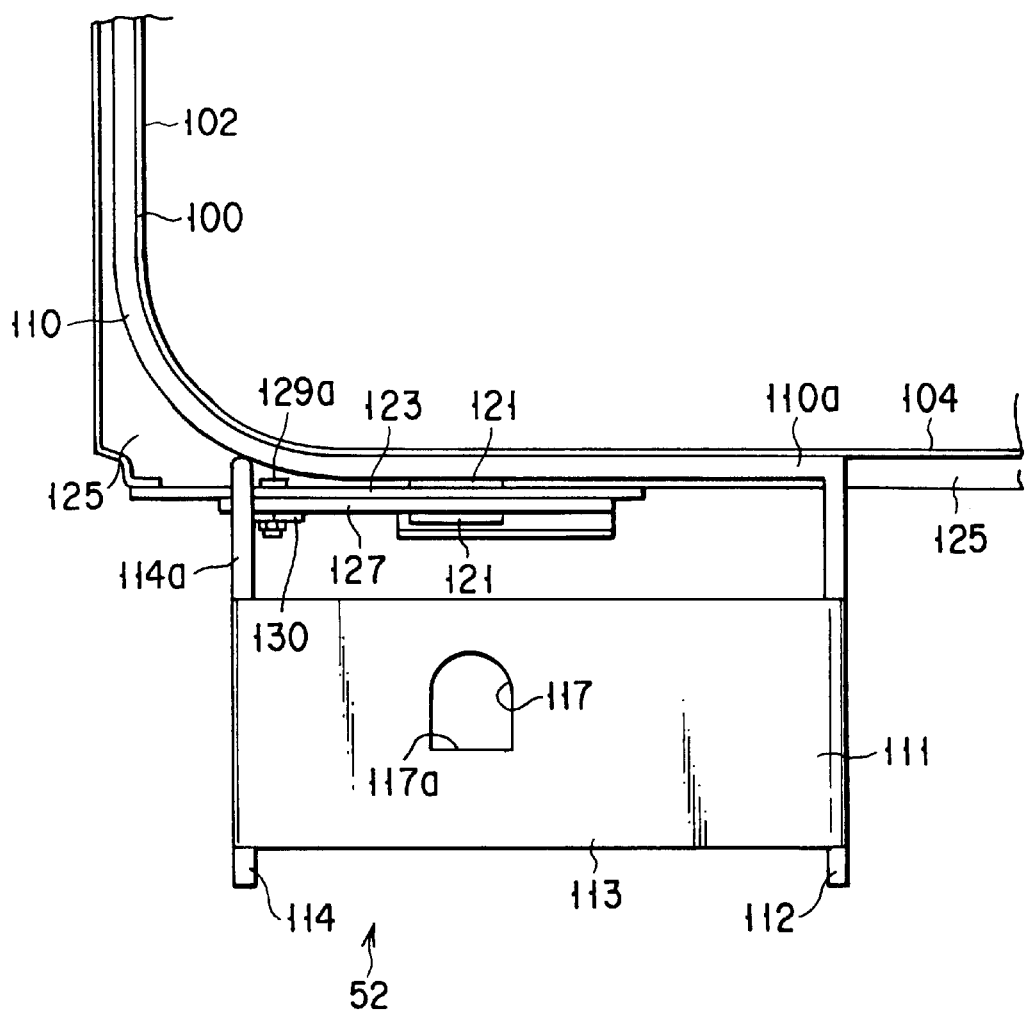
FIG. 29 is a plan view showing a main portion in the hopper shown in FIG. 27.

As shown in FIG. 28, the hook 111 for engaging with and disengaging from the supporting arm 42 is integrally protruded from an end portion 110*a* in a side of the side surface plate 104 of the band plate 110.

The hook 111 is constituted by a flat first leg plate 112 in a perpendicular direction vertically bent from the end portion 111*a* of the band plate 110, a flat upper plate 113 bent from an upper end portion of the first leg plate 112 in a circular arc shape, connected in a horizontal direction and perpendicularly crossing to the first leg plate 112, and a flat second leg plate 114 connected so as to bent downward from an end portion of the upper plate 113 in a circular arc shape and being in parallel to the first leg plate 112, and is formed in a substantially U shape.

Figure 32:
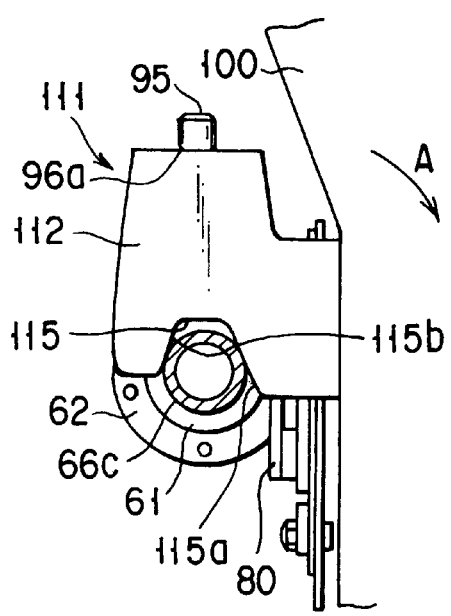
FIG. 32 is a right side elevational view showing a state of supporting the hopper by the supporting arm shown in FIG. 22.

A first engagement recess portion 115 expanding in a lower side in an inverted V shape with first and second inclined end surfaces 115*a* and 115*b* for being brought into contact with upper both sides of an annular bottom portion 66*c* in an annular groove 66 at a front end of the arm portion 61 of the supporting arm 42 from right and left sides is provided in a lower end of the first leg plate 112, as shown in FIG. 32.

Figure 33:
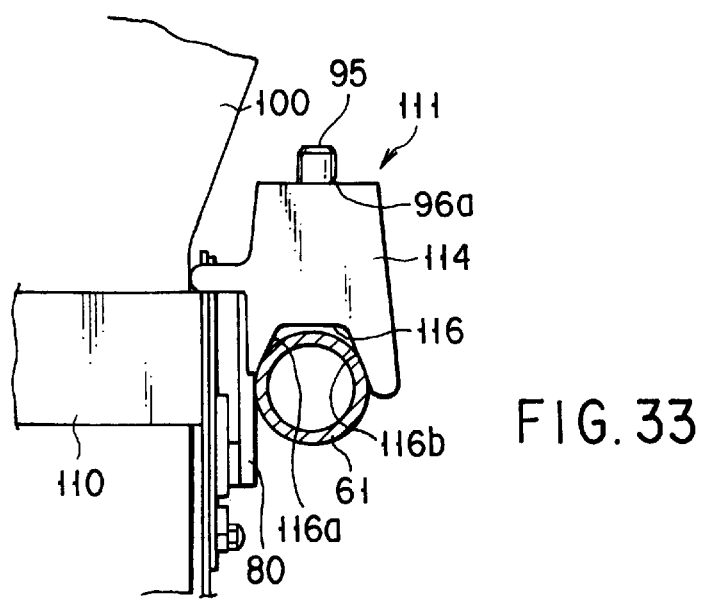
FIG. 33 is a left side elevational view showing a state of supporting the hopper by the supporting arm shown in FIG. 22.

Further, a second engagement recess portion 116 expanding in a lower side in an inverted V shape with third and fourth inclined end surfaces 116*a* and 116*b* for being brought into contact with upper both sides of an outer peripheral surface of the arm portion 61 slightly in a side of the base portion apart from the cylindrical expansion body 67 from right and left sides is provided in a lower end of the second leg plate 114, as shown in FIG. 33.

Further, in the upper plate 113 of the hook 111, an engagement projection 95 protruded from an upper portion of the cylindrical expansion body 67 is inserted in a center slightly close to the second leg plate 114, and an engagement hole 117 having a linear hole edge end surface 117*a* brought into contact with a taper portion 96*a* in a notch 96 of the engagement projection 95 is provided.

In this case, a tongue piece 114*a* extending to the band plate 110 from the second leg plate 114 is protruded.

A front end of the tongue piece 114*a* is adhered to the band plate 110 in accordance with a welding.

Figure 27:
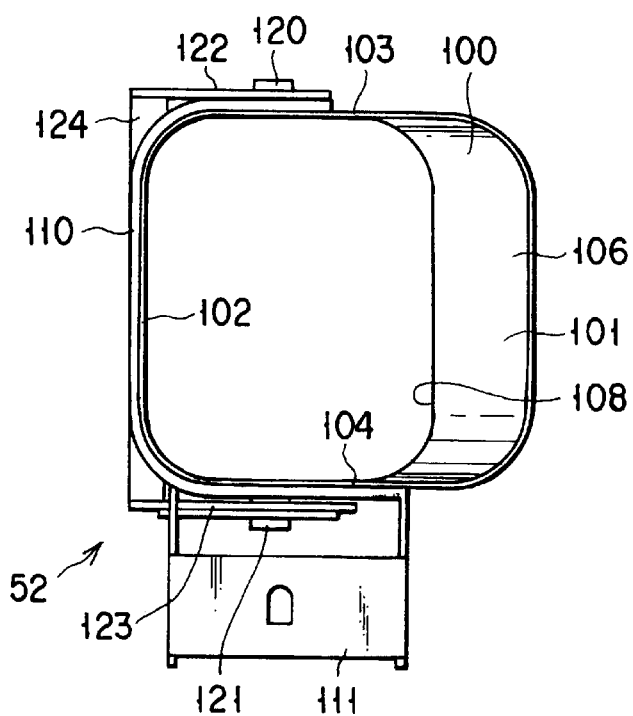
FIG. 27 is a plan view showing a hopper employed in the second embodiment of the combination weighing apparatus in accordance with the present invention.

As shown in FIG. 27, mounting shafts 120 and 121 are stood from positions on the same straight line of the end portion 110*a* in the side of the side surface plate 103 and the end portion 110*b* in the side of the side surface plate 104 in the hopper main body 100 of the band plate 110.

Flat rotary arms 122 and 123 parallel to each other are rotatably mounted to the mounting shafts 120 and 121.

The mounting shafts 120 and 121 corresponding to a center of rotation exists on the same line as an axial line of the shaft 81 of the opening and closing operation driving lever 80 in the supporting arm 42 in a state of hooking the hook 111 to the supporting arm 42.

The rotary arms 122 and 123 are integrally connected by a perpendicularly crossing bottom plate 124.

The opening and closing lid 125 for closing the discharge port 108 of the hopper main body 100 is fixed to an upper surface of the bottom plate 124 by a suitable means such as a welding or the like.

With overlapping on the outer surface of the rotary arm 123, an adjustment plate 127 having a rectangular slit 126 (refer to FIG. 34) to which the engagement projection 80*a* of the opening and closing operation driving lever 80 is inserted from a lower side is rotatably mounted to the stud 121 in the same manner as the rotary arm 123.

Figure 30:
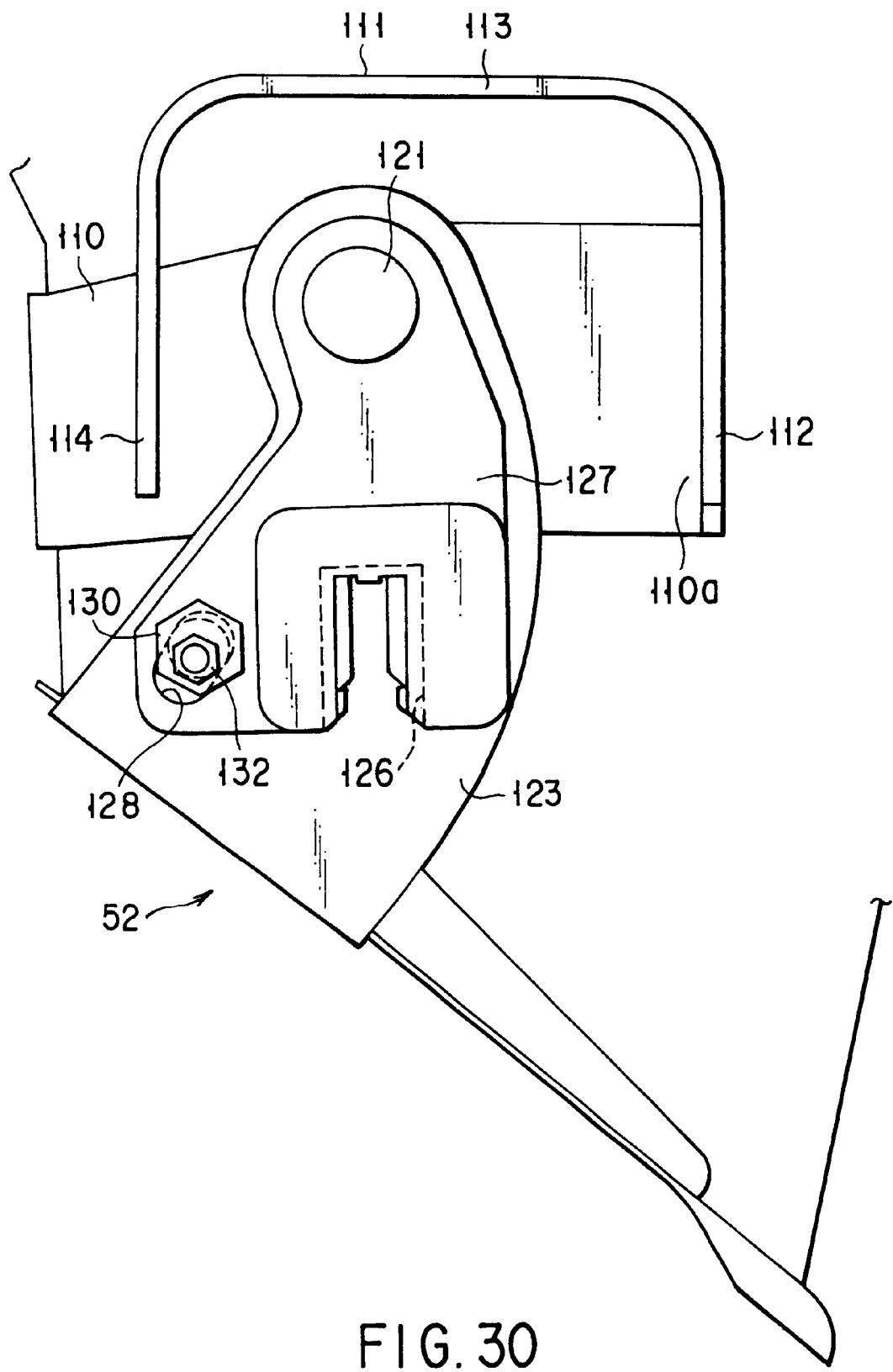
FIG. 30 is a front elevational view showing a main portion in the hopper shown in FIG. 27.
Figure 35:
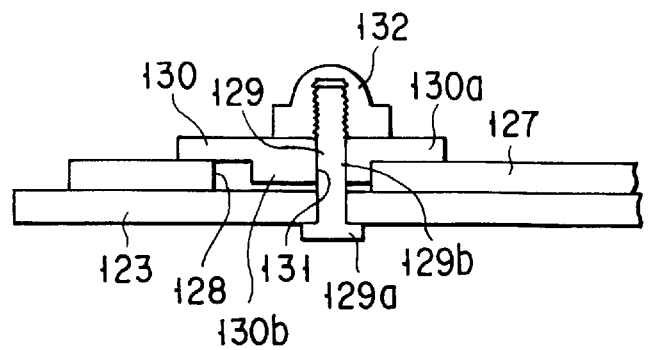
FIG. 35 is a cross sectional view showing a main portion in the hopper shown in FIG. 27.
Figure 36:
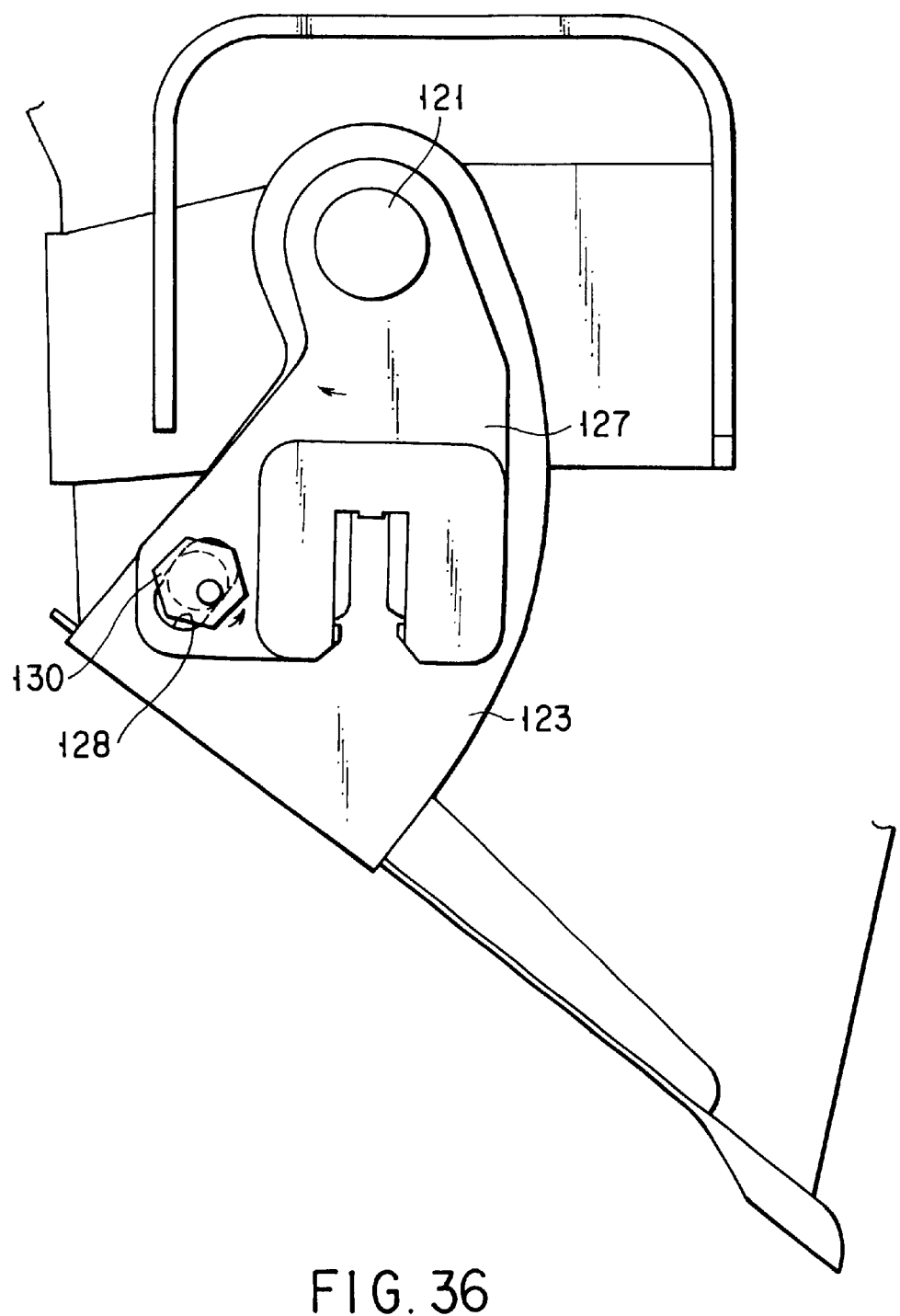
FIG. 36 is a front elevational view showing an operating state of an adjusting body in the hopper shown in FIG. 27.

The adjustment plate 127 is provided with an oval cam hole 128 in a side portion of the engagement slit 126, as shown in FIGS. 30, 35 and 36.

A shaft 129*b* of a bolt 129 to which a head portion 129*a* is fixed by a suitable means such as a welding or the like is protruded from a back surface of the rotary arm 123 through a hole 123*a* of the rotary arm 123.

Accordingly, the shaft 129*b* of the bolt 129 protrudes further outward through a hole 131 of a cam body 130 received within the cam hole 128 of the adjustment plate 127.

In the cam body 130, a disc 130*b* of a regular circle having a diameter slightly smaller than a short axis of the cam hole 128 and a thickness slightly less than a thickness of the adjustment plate 127 is protruded from a portion having a size larger than the short axis of the oval cam hole 128, for example, a back surface of a regular hexagonal plate-shaped base table 130*a*.

Accordingly, the hole 131 exists at a position eccentric from a center of a regular circle of the disc 130*b*.

Further, a ball head lock nut 132 is engaged with a screw surface at a front end of the shaft portion 129*b* of the bolt 129 on the outer surface of the base table 130*a*.

Further, the adjustment plate 127 is fastened and fixed between the outer surface of the rotary arm 123 and the back surface of the outer edge portion in the base table 130*a* of the cam body 130.

Accordingly, when loosening the ball head lock nut 132 so as to rotate the cam body 130, the cam body 130 rotates around the hole 131 at the eccentric position, that is, around the shaft portion 129*b* of the bolt 129 fixed to the rotary arm 123.

Then, the peripheral edge portion of the disc 130*b* presses a hole end surface of the oval cam hole 128, whereby the adjustment plate 127 can rotate around the mounting shaft 121 with respect to the rotary arm 123, as shown in FIG. 36.

Accordingly, by adjusting the rotational position of the adjustment plate 127 with respect to the rotary arm 123 in the manner mentioned above so as to again fasten the ball head lock nut 131, it is possible to change a mounting angle of the adjustment plate 127 with respect to the rotary arm 123, and it is possible to adjust by the cam body 130 so that the opening and closing lid 125 securely closes the discharge port 108.

Figure 34:
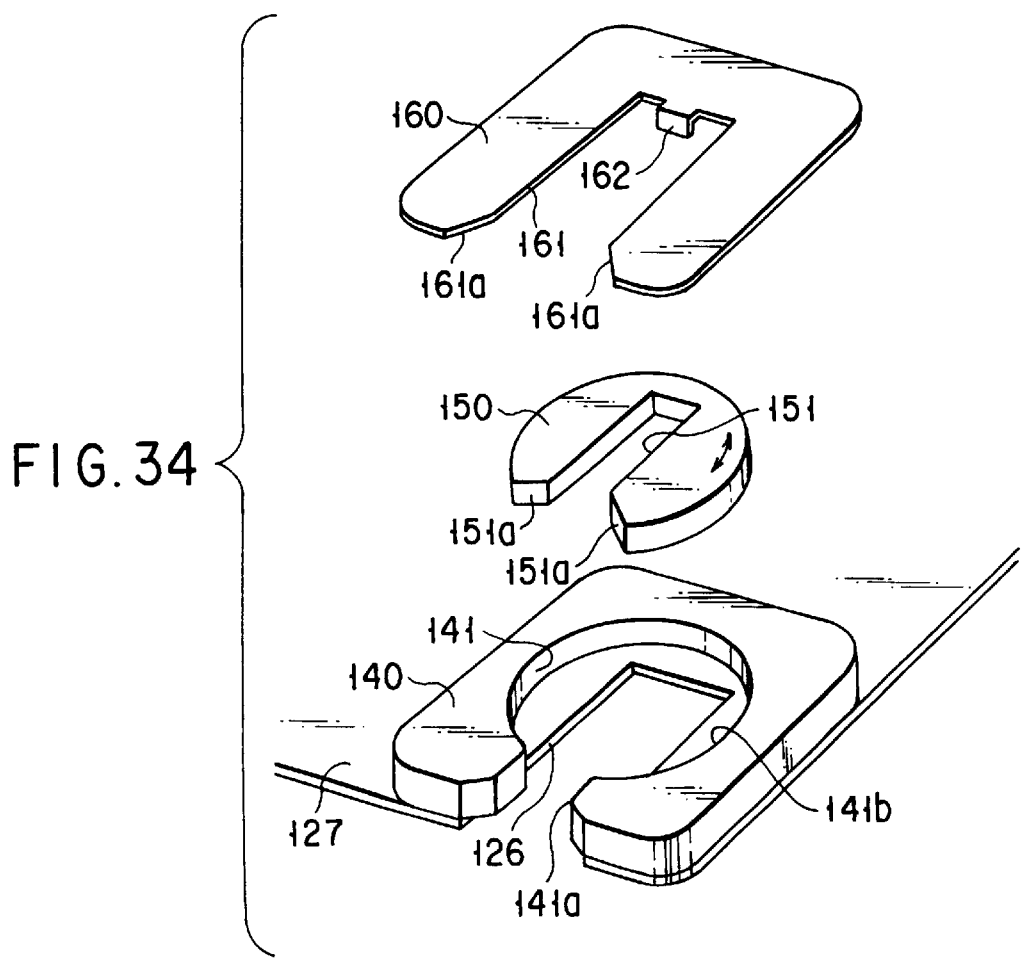
FIG. 34 is an exploded perspective view showing a main portion in the hopper shown in FIG. 27.

As shown in FIG. 34, a plate-like spacer 140 is fixed to an outer surface of the adjustment plate 127 by a suitable means such as a welding or the like so that a notch 141 overlaps on the slit 126.

The notch 141 of the spacer 140 is constituted by a inlet portion 141*a* and circular portion 141*b* at the back thereof.

The slit 126 of the adjustment plate 127 and the inlet portion 141*a* of the notch 141 in the spacer 140 are set to be significantly wider than the engagement protrusion 80*a* so that the engagement protrusion 80*a* of the opening and closing operation driving lever 80 can pass therethrough even in the case that it is a little inclined without coinciding with a linear direction of the slit 126.

A rotary body 150 formed in a rotatable disc shape inward contact with an inner peripheral surface of a circular portion 141*b* and having a thickness slightly smaller than that of the spacer 140 is received within the circular portion 141*b* of the notch 141 in the spacer 140.

An engagement slit 151 in a diametrical direction which the engagement protrusion 80*a* of the opening and closing operation driving lever 80 which is moved from the slit 126 and the inlet portion 141*a* is inserted to and engaged with is provided in the rotary body 150.

Taper portions 151*a* and 151*a* for making it easy to insert the engagement protrusion 80*a* are provided in both sides of the inlet of the engagement slit 151.

A cover plate 160 for preventing the rotary body 150 from being taken out is fixed to the outer surface of the spacer 140 by a suitable means such as a welding or the like.

The cover plate 160 is provided with a rectangular notch 161 having taper portions 161*a* and 161*a* in both sides of the inlet.

A plate-like stopper 162 bent inward is provided at the back of the notch 161.

This plate-like stopper 162 is in a state of moving forward to the back portion of the engagement slit 151 of the rotary body 150.

This is provided for the purpose of restricting a rotational range of the rotary body 150 in such a manner as to prevent the engagement slit 151 of the rotary body 150 from rotating more than necessary so as to be taken out from the inlet portion 141a of the spacer 140, whereby the engagement protrusion 80a cannot move forward.

In the system of closing the opening and closing lid of the hopper by an urging force of the restoring spring, a collision sound at a time of closing generates a loud sound.

In the system of closing the opening and closing lid of the hopper on the basis of the motor drive which is employed for avoiding this, it is impossible to completely close if any play exists in the engagement with the engagement protrusion 80a of the opening and closing operation driving lever 80.

Accordingly, in order to make the engagement between the slit and the engagement protrusion 80a in a complete sealed state with no play, it is necessary to make a width of the engagement slit as narrow as possible.

However, if the width of the engagement slit is made narrow, it is hard to smoothly insert the engagement protrusion 80a to the engagement slit at a time of mounting the hopper to the supporting arm.

Accordingly, in the second embodiment, the width of the slit 126 of the adjustment plate 127 is increased, the rotary body 150 is provided, and the engagement slit 151 engaging with the engagement protrusion 80a with no play is provided in the rotary body 150.

Figure 37:
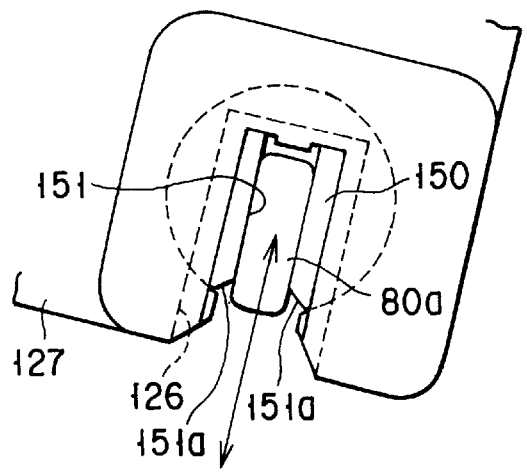
FIG. 37 is a view for explaining an engagement relation with an engagement protrusion.
Figure 38:
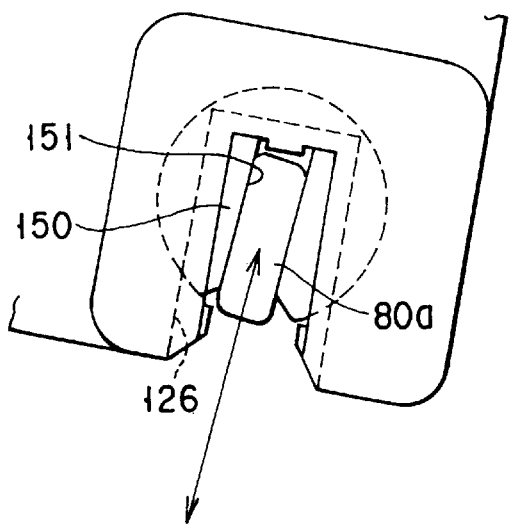
FIG. 38 is a view for explaining the engagement relation with the engagement protrusion.

Accordingly, for example, as shown in FIG. 37, even in the case that the engagement protrusion 80a is in the same direction as that of the slit 126, or even in the case of being oblique as shown in FIG. 38, the engagement protrusion 80a is guided by the taper portion 151a so as to move to the engagement slit 151 of the rotary body 150.

Further, since the rotary body 150 rotates to be in the same direction in correspondence to the forward movement of the engagement protrusion 80a, an incline generated by the slit 126 and the engagement protrusion 80a being a little inclined from the same straight line is absorbed by the rotary body 150, so that it is possible to smoothly insert and engage.

Further, at a time of taking out the hopper, when the engagement protrusion 80a starts being taken out from the engagement slit 151 of the rotary body 150, the rotary arm 123 starts rotating due to an empty weight of the opening and closing lid 125 and starts inclining with respect to the engagement protrusion 80a.

Even in this case, since the rotary body 150 rotates in correspondence to the incline, it is possible to smoothly take out the engagement protrusion 80a.

Since the supporting arm 42 and the hopper 52 are structured in the manner mentioned above, the hopper 52 can be mounted to the supporting arm 42 by manually holding the hopper main body 100 by one hand while supporting the opening and closing lid 125 from the lower portion by another and so as to close the discharge port 108 and inserting the upper end portion of the engagement protrusion 80a at the lower end of the opening and closing operation driving lever 80 in the supporting arm 42 from the lower side of the slit 126 of the adjustment plate 127 in the hopper 52 (the inlet portion 141a of the notch 141 in the spacer 140 and the notch 161 of the cover plate 160).

At this time, the second leg plate 114 is put on the base portion side from the cylindrical expansion body 67 in the arm portion 61 by guiding and inserting the first leg plate 112 of the hook 111 to the taper portions 66a and 66b of the annular groove 66 at the front end of the arm portion 61 in the supporting arm 42 while inserting the engagement protrusion 95 protruding upward from the cylindrical expansion body 67 of the supporting arm 42 to the engagement hole 117 of the upper plate 113 in the hook 111, and the hands are released.

In accordance with the operation mentioned above, the engagement protrusion 80a of the opening and closing operation driving lever 80 enters within the engagement slit 151 of the rotary body 150.

Accordingly, in the case that the engagement protrusion 80a and the engagement slit 151 do not coincide on the same straight line, the engagement protrusion 80a moves forward to the engagement slit 151 of the rotary body 150 so as to be engaged while the rotary body 150 rotates within the circular portion 141b of the notch 141 in the spacer 140 so as to comply with the engagement protrusion 80a.

Further, first and second inclined end surfaces 115a and 115b in both sides of the first engagement recess portion 116 notched in an inverted V shape in the first leg plate 112 are brought into contact with both sides of the upper portion of the cylindrical groove bottom portion 66a in the annular groove 66.

Further, third and fourth inclined end surfaces 116a and 116b in both sides of the second engagement recess portion 116 notched in an inverted V shape in the second leg plate 114 are brought into contact with both sides of the upper portion of the cylindrical arm portion 61.

Then, the linear hole edge end surface 117a in a side apart from the hopper main body 100 in the engagement hole 117 of the upper plate 113 becomes in a state of being brought into contact with the taper portion of the upper portion of the notch 96 in the engagement projection 95 of the supporting arm 42 due to a moment of rotation in a clockwise direction (in FIG. 32) caused by the mass of the hopper main body 100, whereby the hopper 52 is held in a state of being supported by the supporting arm 42.

In a state that the hopper 52 is supported by the supporting arm 42 as mentioned above, the hole edge end surface 117a of the engagement hole 117 in the upper plate 113 of the hook 111 is pressed to the taper portion 96a of the notch 96 in the engagement projection 95 as mentioned above, the first inclined end surface 115a in the side of the hopper main body 100 of the first leg plate 112 is pressed to the groove bottom portion 66a of the annular groove 66 in the arm portion 61, and the third inclined end surface 116a in the side of the hopper main body 100 of the second leg plate 114 is pressed to the outer peripheral surface of the arm portion 61, whereby a moment A in a clockwise direction due to the mass of the hopper main body 100 shown in FIG. 32 is supported.

Figure 31:
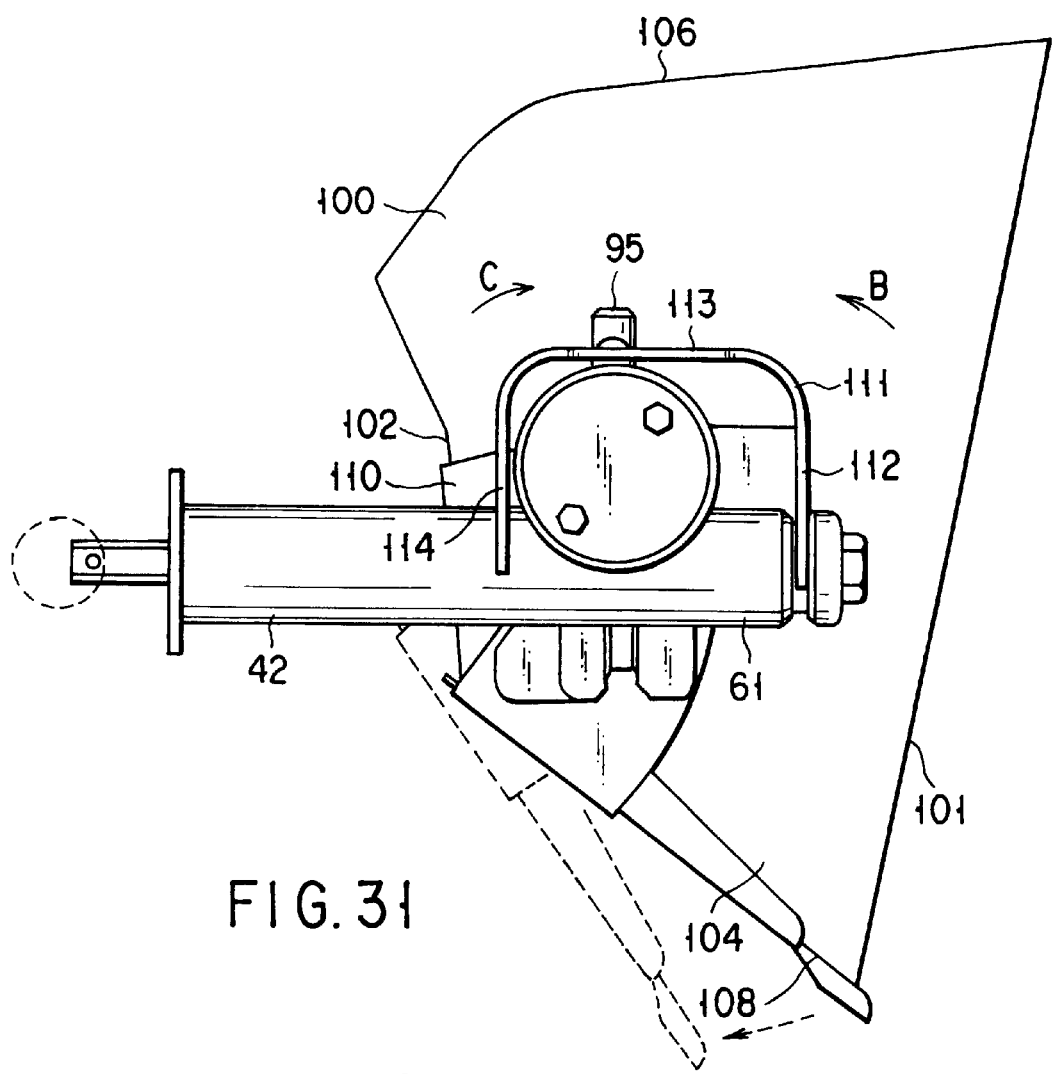
FIG. 31 is a front elevational view showing a state of supporting the hopper by the supporting arm shown in FIG. 22.

Further, in the case that a moment B in a counterclockwise direction shown in FIG. 31 is applied by driving the opening and closing lid or due to the other external forces, the lower end portion of the first leg plate 112 (the lower end portion in both sides of the first engagement recess portion 115) is pressed to the groove wall in the front end side of the annular groove 66 in the supporting arm 42, and the third and fourth inclined end surfaces 116a and 116b in the second leg plate 114 are pressed to the outer peripheral surface of the arm portion 61, whereby the moment B is supported.

Further, in FIG. 31, in the case that a moment C in a clockwise direction is inversely applied, the edge of the engagement hole 117 of the upper plate 113 in the hook 111 is pressed to the engagement projection 95 of the supporting arm 42 and the first and second inclined end surfaces 115a and 115b of the first leg plate 112 are pressed to the groove bottom portion 66a of the annular groove 66 in the leg portion 61, whereby the moment C is supported.

Further, the axial movement of the arm portion 61 in the supporting arm 42 is restricted by both side groove walls in the annular groove 66 with respect to the first leg plate 112, and restricted by the edge of the engagement hole 117 in the upper plate 113 and the engagement projection 95 of the supporting arm 42.

Accordingly, even when the downward incline of the front end side of the supporting arm is different at every supporting arms 41, 42 and 43, it is possible to support without relation thereto.

In spite that it is possible to significantly easily mount the hopper 52 to the supporting arm 42 in the manner mentioned above, the hopper 52 can be securely supported without moving and generating any play even when receiving forces in every directions mentioned above.

In this case, the first and second inclined end surfaces 115a and 115b of the first leg plate 112 ride over the groove bottom portion 66a of the annular groove 66 in the supporting arm 42 as mentioned above so as to be brought into contact at any two points.

Further, the third and fourth inclined end surfaces 116a and 116b of the second leg plate 114 ride over the outer peripheral surface of the arm portion 61 so as to be brought into contact at any two points.

Accordingly, since a dimensional error is absorbed even in the case that a dimensional accuracy of each of the portions is not high, the hopper 52 can be supported with no play without being affected thereby even when a minor dimensional error exists.

Further, the inclined notch of the engagement protrusion 95 is brought into contact with the linear hole edge end surface 117a of the engagement hole 117 in the upper plate 113 of the hook 111 at the portion having any height in the taper portion 96a gradually becoming deeper.

Accordingly, even in the case that the dimensional accuracy of each of the portions is not high, the dimensional error can be absorbed, so that even when the minor error exists, the hopper 52 is supported with no play without being affected thereby.

In this case, the opening and closing lid 125 is opened and closed due to the rotation of the rotary plate 85 executed by the motor (not shown), however, it is possible to adjust a relative angle between the adjustment body 127 and the rotary arm 123 due to the rotation of the cam body 130 mentioned above so as to obtain a state that the opening and closing lid 108 firmly closes the discharge port 108 of the hopper main body 100 in a state that the rotary plate 85 is at the closed position.

Further, by taking out the lid screw 64 at the front end of the arm portion 61 of the supporting arm 42 so as to insert the tool and rotating the adjustment screw 89 so as to change the position in the operation bar 84 of the block 86, it is also possible to adjust so as to firmly close the opening and closing lid 108.

In this case, the above description is given of the supporting arm 42 and the weighing hopper 52 in the middle position, however, the supporting arms 41 and 43 disposed in the upper and lower portion thereof, the stock hopper 51 and the memory hopper 53 have absolutely the same structures as those of the supporting arm 42 and the weighing hopper 52, and the engagement and the disengagement with respect to the respective supporting arms are executed in the absolutely same manner.

As mentioned above, in the combination weighing apparatus in accordance with the second embodiment of the present invention, the hopper is detachably supported to the supporting arm provided so as to protrude outward from the casing in the side portion of the hopper main body.

Accordingly, since a worker can attach and detach the hopper while viewing the side portion of the hopper, the engaging and disengaging operation of the hopper can be significantly easily and securely executed.

Further, in the combination weighing apparatus in accordance with the second embodiment of the present invention, since the structure is made such that the hook is fixed to the side wall of the hopper and the hopper is supported to the supporting arm by engaging the hook with the supporting arm, it is possible to easily engage and disengage by the hook.

Further, in the combination weighing apparatus in accordance with the second embodiment of the present invention, since the hook is provided with the leg portion supported from the lower side by the supporting arm, and the rotation restricting means for restricting the rotation due to the force of gravity of the hopper with respect to the supporting arm, it is possible to securely support in a state of preventing the rotation due to the force of gravity of the hopper around the lower end portion of the leg portion in the hook by the rotation restricting means.

Further, in the combination weighing apparatus in accordance with the second embodiment of the present invention, since the hook is provided with the leg portion supported from the lower side by the supporting arm, and the rotation restricting means for restricting the rotation due to the force of gravity of the hopper with respect to the supporting arm, and the supporting arm is provided with the movement restricting means for restricting the axial movement of the supporting arm of the leg portion, the hopper is not disengaged even in the case that the supporting arm is provided in the state of being inclined from the horizontal state.

Further, in the combination weighing apparatus in accordance with the second embodiment of the present invention, since the supporting arm is provided with the pipe portion installing the driving means for opening and closing the opening and closing lid opening and closing the discharge port of the hopper therein, the supporting arm commonly supports the hopper and opens and closes the opening and closing lid, so that the structure becomes significantly simple.

Accordingly, as described above in detail, in accordance with the present invention, it is possible to provide the combination weighing apparatus which solves the problems and the disadvantages of the conventional combination weighing apparatus and can be easily cleaned.

What is claimed is:

1. A combination weighing apparatus comprising:
   a casing;
   a plurality of drive sources provided in an inner portion of said casing;
   a plurality of hollow hopper supporting arms provided so as to protrude to an external portion from said casing;
   a plurality of opening and closing operation driving mechanisms sealed in respective inner portions of said plurality of hopper supporting arms and transmitting drive forces respectively applied from said plurality of drive sources;

a plurality of hoppers attached to hopper attaching portions at respective front ends of said plurality of hopper supporting arms, respectively having receiving ports for subjects to be weighed at respective upper ends and having discharge ports for said subjects to be weighed at respective lower ends;

a plurality of opening and closing lids respectively provided in said plurality of hoppers in a freely rotatable manner, and respectively opening and closing said discharge ports of said plurality of hoppers;

a plurality of couplings respectively mounted to said plurality of opening and closing lids; and a plurality of opening and closing operation driving bodies provided on outer surfaces of the hopper attaching portions at the respective front ends of said plurality of hopper supporting arms in an exposed state, respectively driven by said plurality of opening and closing operation driving mechanisms, and respectively engaged with said plurality of couplings due to the respective attachment of said plurality of hoppers so as to respectively open and close said plurality of opening and closing lids.

2. A combination weighing apparatus according to claim 1, wherein respective rotary shafts of said plurality of couplings and respective rotary shafts of said plurality of opening and closing operation driving bodies are arranged on the same axis.

3. A combination weighing apparatus according to claim 1, wherein said plurality of drive sources are respectively constituted by motors, and said plurality of opening and closing operation driving mechanisms are respectively constituted by link mechanisms connected to the respective motors.

4. A combination weighing apparatus according to claim 1, wherein in the case that said plurality of hoppers are weighing hoppers for weighing said subjects to be weighed, said plurality of hoppers are further provided with a plurality of weighing devices respectively measuring the respective masses of the subjects to be weighed received in the respective weighing hoppers, and said plurality of weighing devices are respectively structured such that respective fixed ends of said plurality of weighing devices are fixed to an inner side of said casing, and respective free ends of said plurality of weighing devices fix said plurality of drive sources to said plurality of hopper supporting arms provided so as to protrude outward from insertion holes provided in said casing.

5. A combination weighing apparatus according to claim 1, wherein said plurality of hoppers are respectively supported to a plurality of supporting arms provided so as to protrude outward from said casing, in such a manner as to be freely attached and detached in respective side portions of said plurality of hoppers.

6. A combination weighing apparatus according to claim 1, further comprising a plurality of hooks fixed to the respective side walls of said plurality of hoppers, wherein said plurality of hooks are respectively engaged in correspondence to said plurality of supporting arms, whereby said plurality of hoppers are respectively supported in correspondence to said plurality of supporting arms.

7. A combination weighing apparatus according to claim 1, wherein said plurality of hooks are respectively provided with leg portions respectively supported by said plurality of supporting arms from lower sides thereof, and rotation restricting means for restricting the rotation of said plurality of hoppers due to gravitation with respect to said plurality of supporting arms.

8. A combination weighing apparatus according to claim 7, wherein said plurality of supporting arms are respectively provided with movement restricting means for restricting respective axial motions of said plurality of supporting arms in said leg portions.

9. A combination weighing apparatus according to claim 1, wherein said plurality of opening and closing drive bodies have opening and closing operation driving levers rotating for respectively opening and closing said plurality of opening and closing lids, said plurality of opening and closing operation driving mechanisms have rotary shafts of said opening and closing operation driving levers, operating bars respectively operated by said plurality of drive sources, cranks in each of which one end is fixed to said rotary shaft and another end is rotatably mounted to said operating bar, and rotating said rotary shafts due to operations of said operating bars, and blocks provided so as to freely move in an axial direction of said operating bars and to which another ends of said cranks are rotatably attached, and angles of rotation of said plurality of opening and closing lids executed by said respective opening and closing drive levers can be adjusted by adjusting axial positions of said blocks in said operating bars so as to adjust the angles of rotation of said cranks.

10. A combination weighing apparatus according to claim 9, wherein the positions of said blocks can be adjusted via adjusting members capable of being operated from respective external portions of said plurality of hopper supporting arms.

11. A combination weighing apparatus according to claim 10, wherein the positions of said blocks can be adjusted by adjusting members capable of being rotated from holes respectively provided in said plurality of hopper supporting arms.

12. A combination weighing apparatus according to claim 9, further comprising adjusting screws engaged with said blocks and capable of adjusting an engagement depth on the basis of a rotational operation from the external portion, wherein the positions of said blocks can be adjusted by the engagement depth of said adjusting screws.

13. A combination weighing apparatus according to claim 9, further comprising adjusting screws engaged with said blocks and capable of adjusting an engagement depth on the basis of a rotational operation from the external portion, and urging means for urging said blocks in a direction of moving apart from the front ends of said driving arms so as to position said adjusting screws at fixed positions in the axial direction of said operating bars, wherein the positions of said blocks can be adjusted by the engagement depth of said adjusting screws.

14. A combination weighing apparatus according to claim 1, further comprising a plurality of adjusting plates respectively provided in said plurality of opening and closing lids, and a plurality of engagement protrusions respectively engaged with said plurality of adjusting plates, wherein said plurality of opening and closing operation driving bodies have opening and closing operation driving levers rotating for respectively opening and closing said plurality of opening and closing lids, and said plurality of adjusting plates have engagement slits which said plurality of engagement protrusions are respectively inserted to and taken out from, and respectively rotate said plurality of opening and closing lids in accordance with the respective insertion of said plurality of engagement protrusions.

15. A combination weighing apparatus according to claim 14, wherein said plurality of adjusting plates are respectively provided so as to freely rotate around the same axes as that of said plurality of opening and closing lids, and are provided with fixing means for respectively fixing said plurality of adjusting plates and said plurality of opening and closing lids.

16. A combination weighing apparatus according to claim 14, wherein said plurality of adjusting plates are respectively structured such that said plurality of engagement protrusions are provided in the same manner so as to be inserted and taken out, at inlets of said engagement slits in which said plurality of engagement protrusions are respectively made insert and taken out, and are provided with rotatable engagement bodies.

17. A combination weighing apparatus according to claim 15, wherein said plurality of adjusting plates are respectively structured such that said plurality of engagement protrusions are respectively provided in the same manner so as to be inserted and taken out, at inlets of said engagement slits in which said plurality of engagement protrusions are respectively made insert and taken out, and are provided with rotatable engagement bodies.

18. A combination weighing apparatus according to claim 16, wherein taper portions expanding outward are provided in both sides of inlet portions in the slits which said plurality of engagement protrusions of said engaging bodies are respectively inserted to and taken out from.

19. A combination weighing apparatus according to claim 17, wherein taper portions expanding outward are provided in both sides of inlet portions in the slits which said plurality of engagement protrusions of said engaging bodies are respectively inserted to and taken out from.

* * * * *

UNITED STATES PATENT AND TRADEMARK OFFICE
CERTIFICATE OF CORRECTION

PATENT NO. : 6,674,021 B2
DATED : January 6, 2004
INVENTOR(S) : Osamu Tanaka

It is certified that error appears in the above-identified patent and that said Letters Patent is hereby corrected as shown below:

<u>Title page</u>,
Item [73], Assignee, change "Anritsu Corporation, Tokyo (JP)" to
-- Anritsu Industrial Solutions Co., Ltd., Atsugi-shi, Kanagawa (JP) --

Signed and Sealed this

Thirtieth Day of November, 2004

JON W. DUDAS
*Director of the United States Patent and Trademark Office*